United States Patent
Chae et al.

(10) Patent No.: US 10,075,972 B2
(45) Date of Patent: Sep. 11, 2018

(54) METHOD AND APPARATUS FOR TRANSMITTING AND RECEIVING SIGNAL FOR DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hakseong Kim, Seoul (KR); Hanbyul Seo, Seoul (KR); Jihyun Lee, Seoul (KR); Kijun Kim, Seoul (KR); Youngtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 162 days.

(21) Appl. No.: 15/033,049

(22) PCT Filed: Oct. 28, 2014

(86) PCT No.: PCT/KR2014/010190
§ 371 (c)(1),
(2) Date: Apr. 28, 2016

(87) PCT Pub. No.: WO2015/065014
PCT Pub. Date: May 7, 2015

(65) Prior Publication Data
US 2016/0249355 A1    Aug. 25, 2016

Related U.S. Application Data

(60) Provisional application No. 61/896,652, filed on Oct. 28, 2013, provisional application No. 61/952,853, (Continued)

(51) Int. Cl.
H04W 72/12    (2009.01)
H04L 5/00    (2006.01)
(Continued)

(52) U.S. Cl.
CPC ....... *H04W 72/1263* (2013.01); *H04L 5/0091* (2013.01); *H04W 72/0446* (2013.01);
(Continued)

(58) Field of Classification Search
CPC ......... H04W 72/1263; H04W 72/1289; H04W 72/0446; H04W 76/023; H04W 76/14;
(Continued)

(56) References Cited

U.S. PATENT DOCUMENTS

2009/0011770 A1    1/2009 Jung et al.
2009/0285163 A1    11/2009 Zhang et al.
(Continued)

FOREIGN PATENT DOCUMENTS

KR    10-2013-0109781    10/2013
WO    2012-128505    9/2012
WO    2013-109100    7/2013

OTHER PUBLICATIONS

Intel Corporation, "Discussion on D2D Operation within Network Coverage (Mode-1)", R1-141164, 3GPP TSG RAN WG1 Meeting #76bis, Apr. 2014, 7 pages.
(Continued)

*Primary Examiner* — Jackie Zuniga Abad
(74) *Attorney, Agent, or Firm* — Lee Hong Degerman Kang Waimey

(57) ABSTRACT

Disclosed is a method for transmission and reception of a device-to-device (D2D) signal by a terminal in a wireless communication system. The method for transmission and reception of a D2D signal, according to an embodiment of the present invention, comprises the steps of: receiving a scheduling assignment comprising a resources pattern for transmission (RPT); and receiving a D2D signal in a subframe indicated in the RPT, wherein each bit of the RPT indicates whether or not the D2D signal is permitted to be
(Continued)

transmitted in the subframe within a scheduling assignment period, and wherein, if the number of the subframes comprised in the scheduling assignment period is greater than the number of the bits of the RPT, at least one bit of the RPT indicates whether or not the D2D signal is permitted to be transmitted in two or more subframes.

13 Claims, 12 Drawing Sheets

Related U.S. Application Data filed on Mar. 13, 2014, provisional application No. 61/971,519, filed on Mar. 27, 2014, provisional application No. 61/977,073, filed on Apr. 8, 2014, provisional application No. 61/989,505, filed on May 6, 2014, provisional application No. 61/990,096, filed on May 7, 2014, provisional application No. 61/992,212, filed on May 12, 2014, provisional application No. 62/001,619, filed on May 21, 2014.

(51) Int. Cl.
*H04W 72/04* (2009.01)
*H04W 76/14* (2018.01)
*H04L 12/911* (2013.01)

(52) U.S. Cl.
CPC ....... *H04W 72/1289* (2013.01); *H04W 76/14* (2018.02); *H04L 5/0051* (2013.01); *H04L 5/0053* (2013.01); *H04L 47/70* (2013.01); *H04W 72/048* (2013.01)

(58) Field of Classification Search
CPC .... H04W 72/048; H04L 5/0091; H04L 47/70; H04L 5/0053; H04L 5/0051
See application file for complete search history.

(56) References Cited

U.S. PATENT DOCUMENTS

| | | |
|---|---|---|
| 2010/0062782 A1 | 3/2010 | Higuchi et al. |
| 2011/0230219 A1 | 9/2011 | Shores et al. |
| 2012/0083283 A1 | 4/2012 | Phan et al. |
| 2012/0208547 A1 | 8/2012 | Geirhofer et al. |
| 2013/0150108 A1 | 6/2013 | Yang et al. |
| 2013/0155962 A1 | 6/2013 | Hakola et al. |
| 2013/0258996 A1 | 10/2013 | Jung et al. |
| 2013/0322276 A1 | 12/2013 | Pelletier et al. |
| 2014/0003262 A1 | 1/2014 | He et al. |
| 2014/0004867 A1 | 1/2014 | Noh et al. |
| 2014/0254509 A1 | 9/2014 | Chen et al. |
| 2014/0328329 A1 | 11/2014 | Novlan et al. |
| 2014/0334392 A1 | 11/2014 | Gage et al. |
| 2015/0063247 A1 | 3/2015 | Lee et al. |
| 2015/0067123 A1 | 3/2015 | Goyal et al. |
| 2015/0208401 A1 | 7/2015 | Lu et al. |
| 2015/0312821 A1 | 10/2015 | Yamazaki |
| 2015/0341775 A1 | 11/2015 | Tiirola et al. |
| 2016/0021676 A1 | 1/2016 | Yamazaki et al. |
| 2016/0057604 A1 | 2/2016 | Luo et al. |
| 2016/0081073 A1 | 3/2016 | Lindoff et al. |
| 2016/0142898 A1 | 5/2016 | Poitau et al. |
| 2016/0183276 A1* | 6/2016 | Marinier ............... H04W 72/02 370/329 |
| 2016/0212793 A1 | 7/2016 | Jung et al. |

OTHER PUBLICATIONS

PCT International Application No. PCT/KR2014/010190, Written Opinion of the International Searching Authority dated Jan. 22, 2016, 16 pages.

PCT International Application No. PCT/KR2014/010191, Written Opinion of the International Searching Authority dated Jan. 26, 2016, 16 pages.

LG Electronics Inc., "Scheduling and Resource Management of D2D Communications", R1-134413, 3GPP TSG RAN WGI Meeting #74bis, Oct. 7-11, 2013, 5 pages.

Intel Corporation., "Discussion on Resource Allocation Methods for D2D Communication", R1-134139, 3GPP TSG RAN WGI Meeting #74bis, Sep. 28, 2013, 10 pages.

U.S. Appl. No. 15/033,043, Office Action dated Nov. 1, 2017, 15 pages.

U.S. Appl. No. 15/033,043, Office Action dated May 29, 2018, 17 pages.

* cited by examiner

FIG. 10
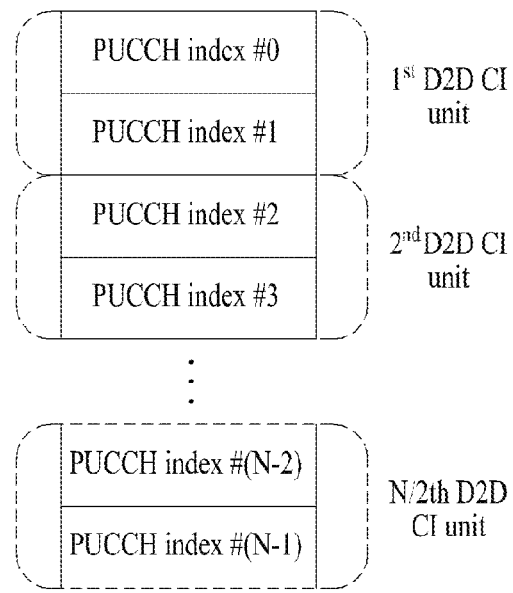
(a)
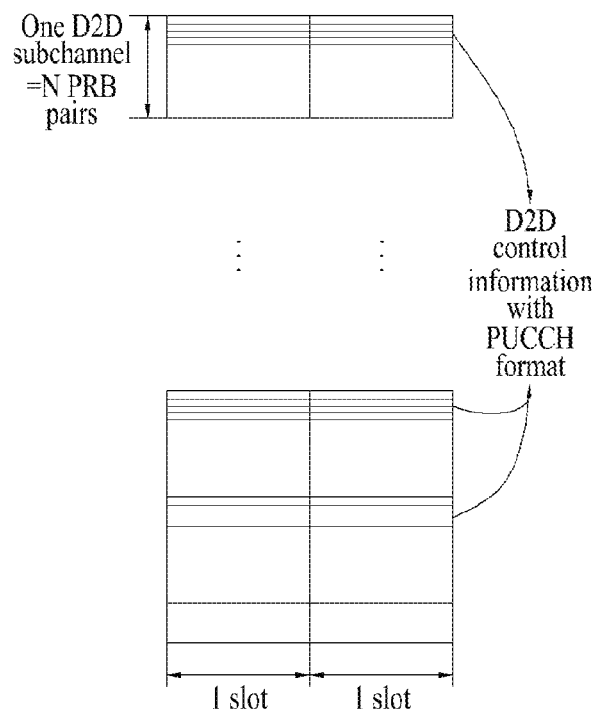
(b)

FIG. 11
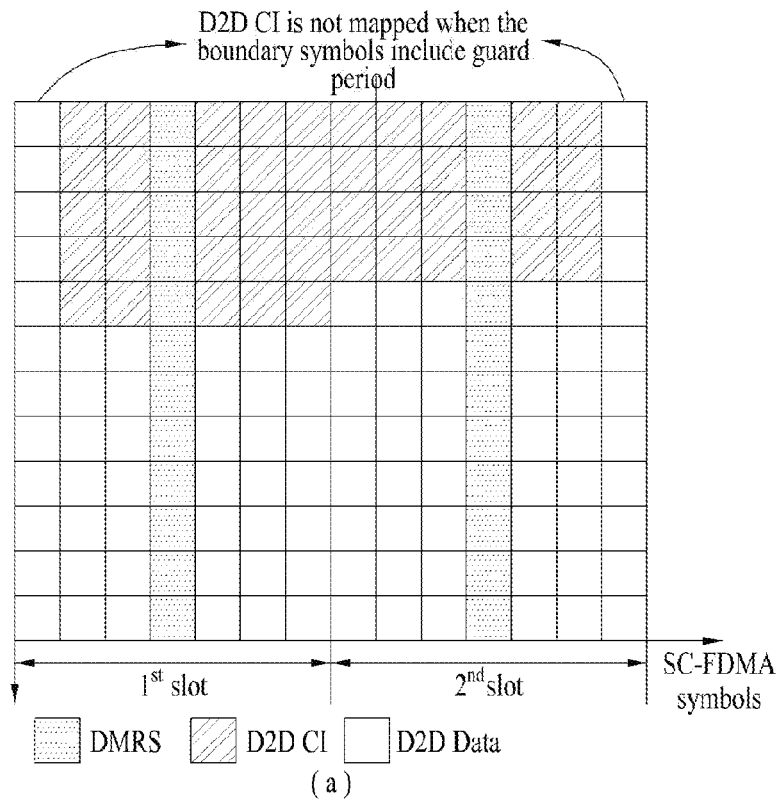
(a)
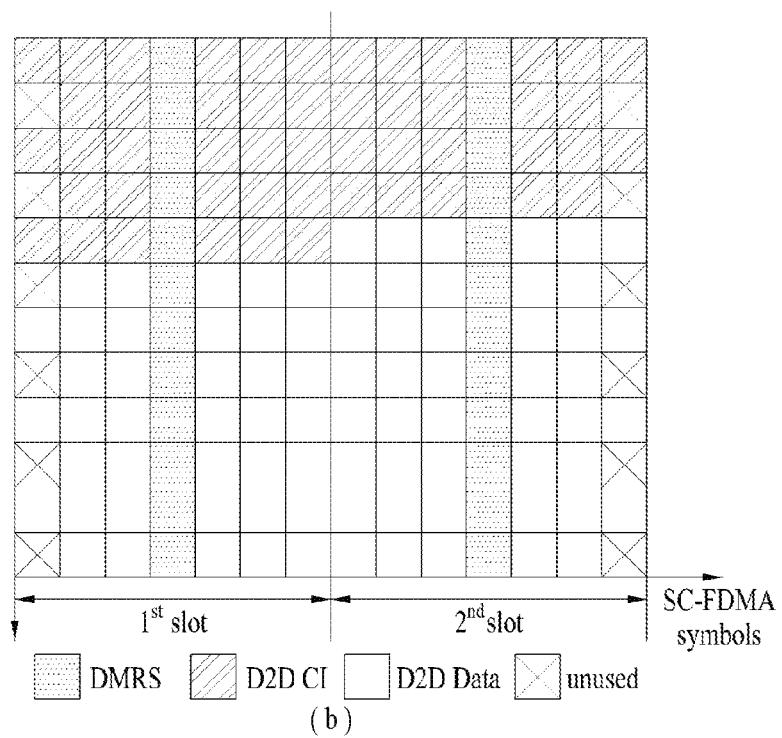
(b)

FIG. 12
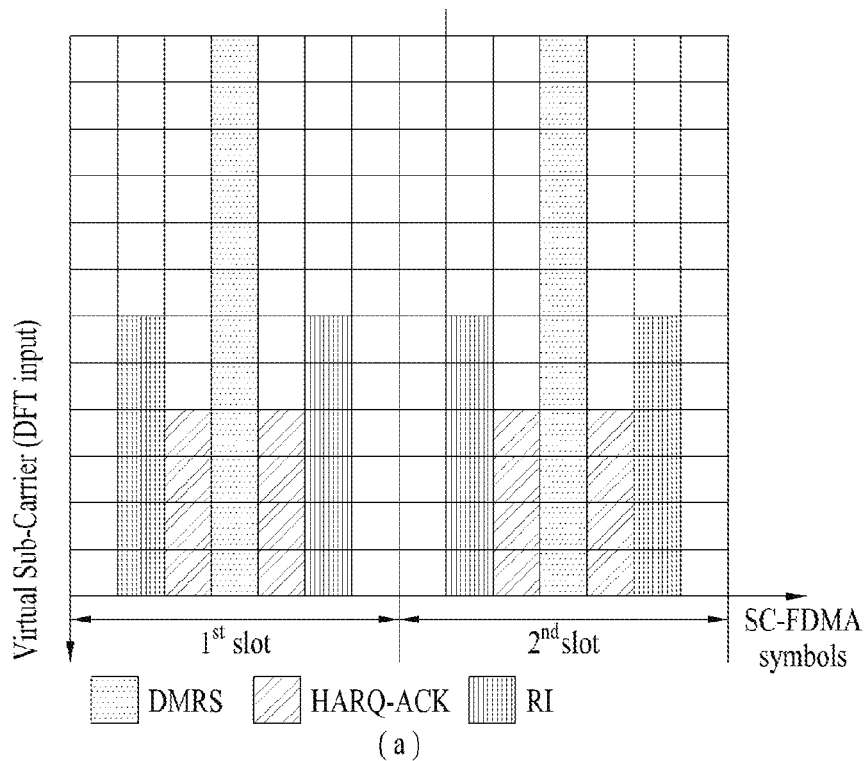
(a)
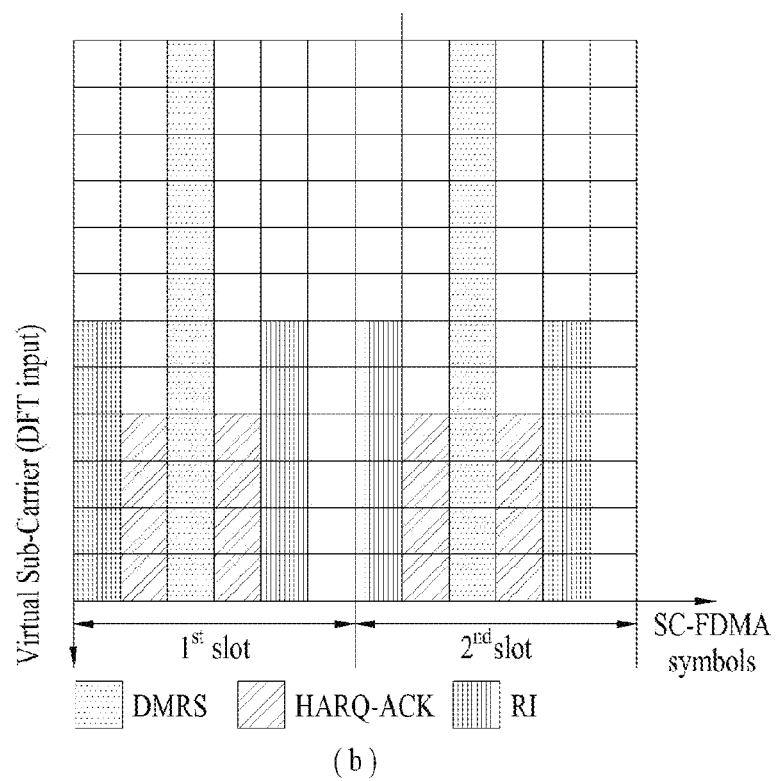
(b)

METHOD AND APPARATUS FOR TRANSMITTING AND RECEIVING SIGNAL FOR DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2014/010190, filed on Oct. 28, 2014, which claims the benefit of U.S. Provisional Application No. 61/896,652, filed on Oct. 28, 2013, 61/952,853, filed on Mar. 13, 2014, 61/971,519, filed on Mar. 27, 2014, 61/977,073, filed on Apr. 8, 2014, 61/989,505, filed on May 6, 2014, 61/990,096, filed on May 7, 2014, 61/992,212, filed on May 12, 2014, and 62/001,619, filed on May 21, 2014, the contents of which are all hereby incorporated by reference herein in their entirety.

TECHNICAL FIELD

Following description relates to a wireless communication, and more particularly, to a method of transmitting and receiving a device-to-device (D2D) signal in device-to-device communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention devised to solve the problem lies in a transmitting/receiving method related to control information and a scheduling assignment signal in device-to-device (D2D) communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The object of the present invention can be achieved by providing a method of transmitting and receiving a device-to-device (D2D) signal by a user equipment (UE) in a wireless communication system, the method including receiving a scheduling assignment including resource patterns for transmission (RPT), and receiving a D2D signal in a subframe indicated in the RPT, wherein each of bits of the RPT indicates whether the D2D signal is permitted to be transmitted in a corresponding at least one of subframes included in a scheduling assignment period, and when the number of subframes included in the scheduling assignment period is greater in number than the bits of the RPT, at least one of the bits of the RPT indicates whether the D2D signal is permitted to be transmitted in two or more of the subframes.

In another aspect of the present invention, provided herein is a device-to-device (D2D) user equipment for transmitting and receiving a D2D signal in a wireless communication system, the D2D user equipment including a transmission module; and a processor, wherein the processor receives a scheduling assignment including resource patterns for transmission (RPT) and receives a D2D signal in a subframe indicated in the RPT, each of bits of the RPT indicates whether the D2D signal is permitted to be transmitted in a corresponding at least one of subframes included in a scheduling assignment period, and when the number of subframes included in the scheduling assignment period is greater in number than the bits of the RPT, at least one of the bits of the RPT indicates whether the D2D signal is permitted to be transmitted in two or more of the subframes.

The above aspects of the present invention may include some or all of the following description.

When the number of subframes included in the scheduling assignment period is greater in number than the bits of the RPT, the UE may repeatedly use the RPT.

When the number of the subframes included in the scheduling assignment period is n times the number of the bits of the RPT, the UE may repeatedly use the RPT in the scheduling assignment period.

The RPT may be repeatedly used in the scheduling assignment period.

When the number of the subframes included in the scheduling assignment period is not a multiple of the number of the bits of the RPT, only a portion of the RPT may be used when the RPT is lastly repeatedly used.

Only the portion of the RPT may be used by sequentially using the bits of the RPT.

The bits of the portion of the RPT may be the same in number as a remainder obtained by dividing the number of the subframes included in the scheduling assignment period by the number of the bits of the RPT.

The UE may receive, from a base station, an instruction regarding a resource region for transmission of the D2D signal.

The UE may receive a resource pool for transmission of the D2D signal from a base station.

The bits of the RTP may indicate only subframes included in the resource pool.

The scheduling assignment may include one or more of the RPT.

The scheduling assignment may be transmitted from a base station or a relay.

Advantageous Effects

According to the present invention, control information and a scheduling assignment signal may be efficiently transmitted/received in D2D communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 10 and 11 are diagrams illustrating the structures of a control channel.

FIG. 12 is a diagram of piggybacking of a HARQ-ACK and an RI.

BEST MODE

Figure 1:
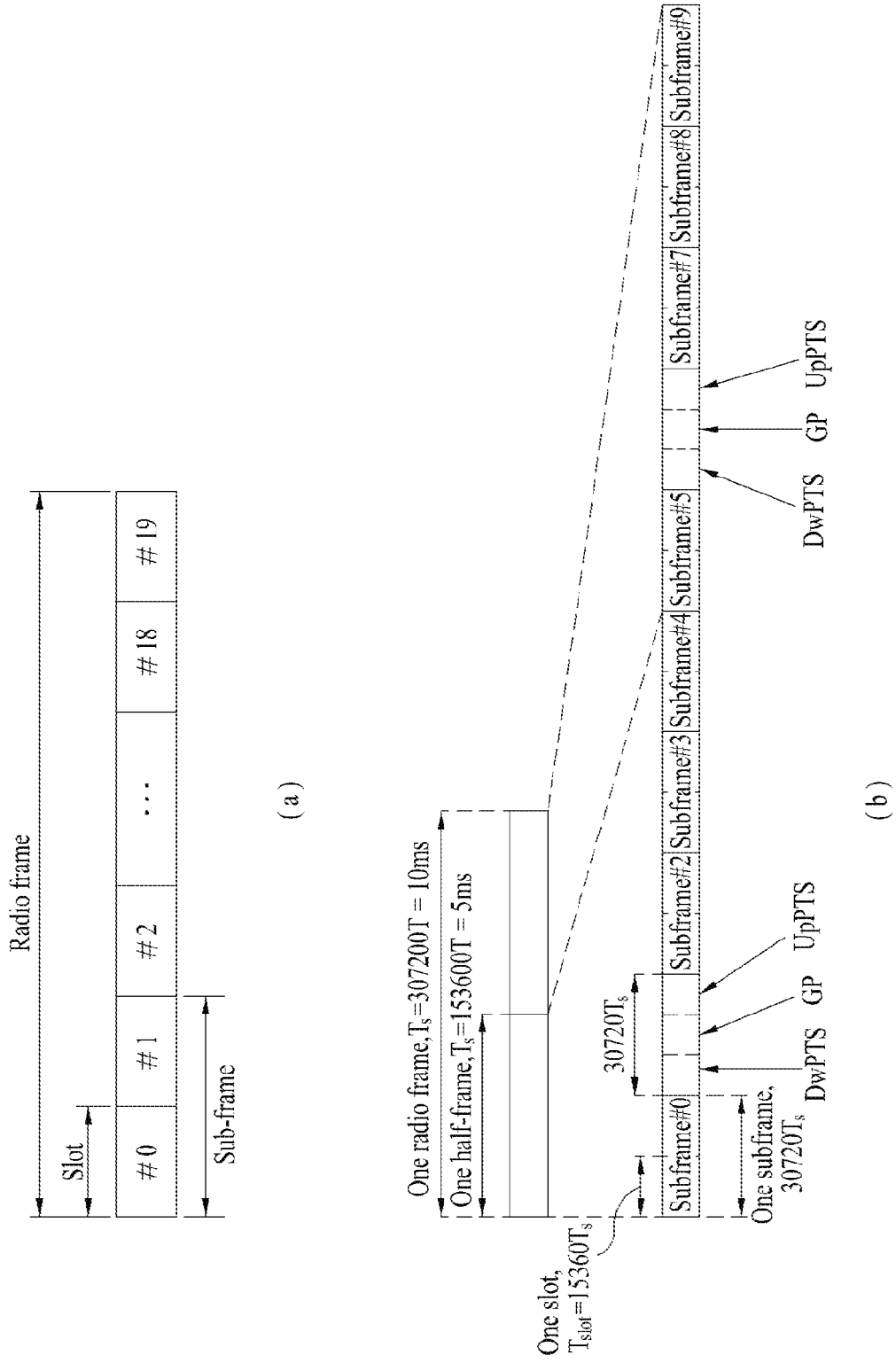
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS.

The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
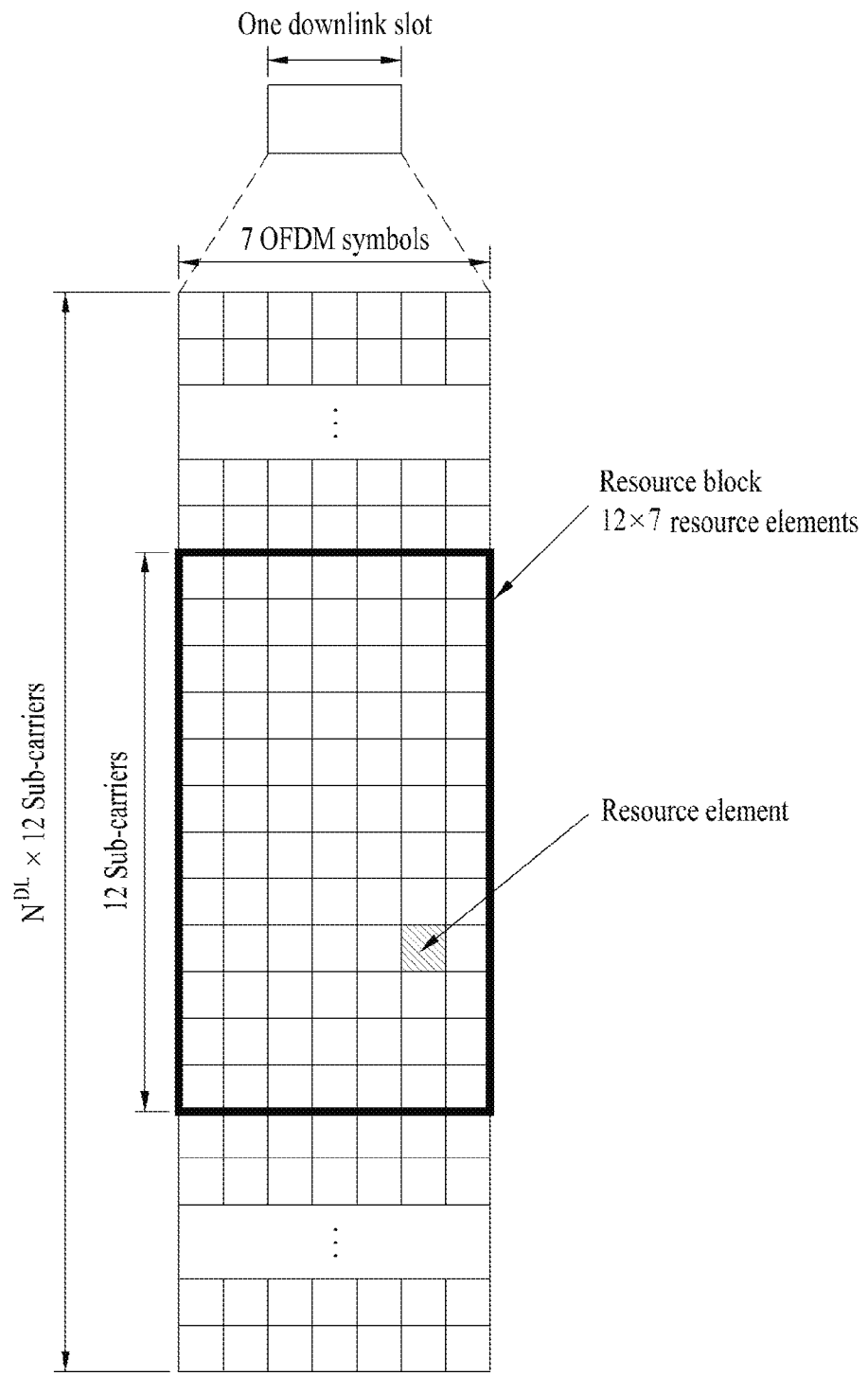
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
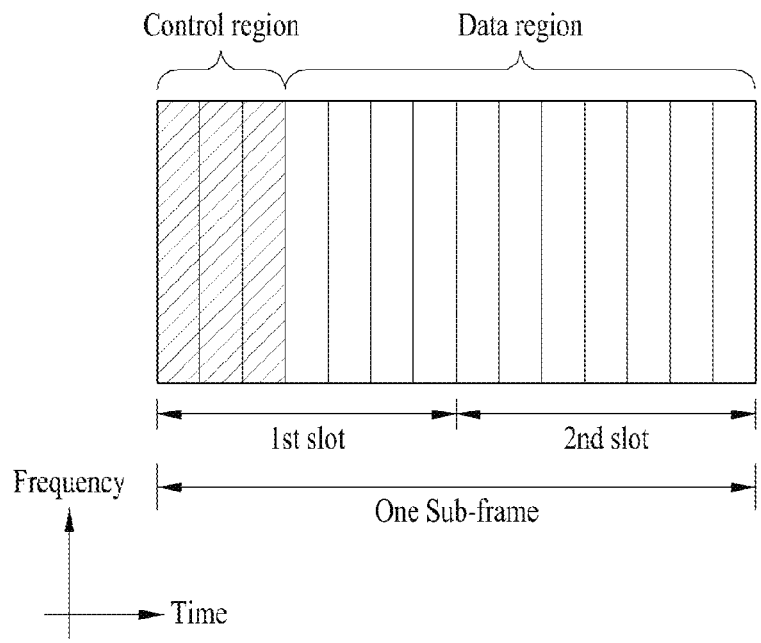
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
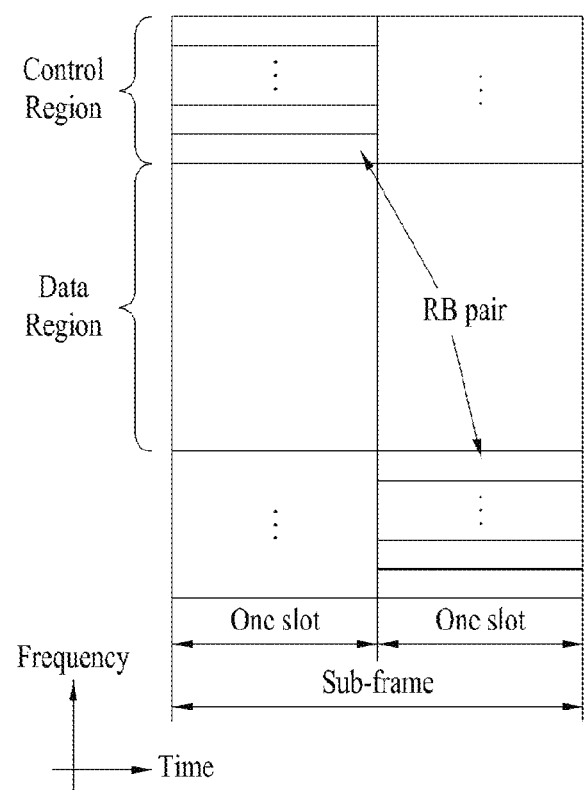
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Hereinafter, control information (CI) for D2D communication, a method of transmitting the CI and/or a channel structure for the CI will be described based on the above description and the legacy LTE/LTE-A system.

Contents Included in CI or SA

CI may include at least one of information items to be described below. Information items included in the CI, which will be described below, may be transmitted according to a method to be described with respect to a channel structure for the CI to be described below or may be periodically transmitted via a separate channel (e.g., a channel for D2D scheduling assignment). The channel for D2D scheduling assignment may be referred to as a D2D scheduling assignment channel (D2DSACH). The D2DSACH may be transmitted in a separate format in a resource region having a predetermined period or may be transmitted in a predetermined subframe by determining a frequency domain by a UE before data is transmitted. This D2DSACH may have an existing PUCCH/PUSCH structure or may have a different format rather than the existing PUSCH/PUCCH structure. For example, the D2DSACH may be transmitted in a modified PUSCH structure which is the same as the PUSCH structure except that some last symbols are used as a guard region for timing or Tx/Rx switching and are thus not transmitted in a subframe. The D2DSACH may employ a format such as a D2D discovery format. For example, when a D2D discovery signal is transmitted in the PUSCH structure, the D2DSACH may also be transmitted in the PUSCH structure. Here, the "D2D discovery signal" refers to a signal that a UE transmits to detect the presence of another UE or to inform neighboring UEs of the presence of the UE itself. When some or all of CI to be described below is transmitted in the D2DSACH, some of the remaining D2D CI except for the transmitted CI may be multiplexed and transmitted together with a D2D data packet. A multiplexing scheme may be one of schemes which will be described below. A new data indicator (NDI) and/or a redundancy version (RV) may be transmitted in a PUSCH piggybacking scheme or NDI information may be indicated using demodulation reference signal cycle shift (DMRS CS). For example, it may be determined that a specific value or a specific set value is used for DMRS CS when new data is transmitted and another specific value or another specific set value is used for DMRS CS when retransmission data is transmitted.

Information items to be described below may be transmitted in a scheduling assignment (SA) channel (The D2DSACH described above will be briefly referred to as an "SA". More specifically, the D2DSACH is a format of a channel transmitting the SA, and the SA is a channel itself transmitting some or all of the D2D CI.). For example, when a UE which receives location information of resources for transmission of an SA from a base station transmits the SA through the resources, the SA may include information items to be described below. Alternatively, when a UE selects resources for transmission of the SA from a resource pool for the SA and transmits the SA through the resources, the SA may include information items to be described below.

a. Resource Allocation (RA) Information

RA information may be information regarding allocation of time and/or frequency resources for transmission/reception of a D2D-related signal (e.g., a D2D communication packet) in a scheduling assignment period after the SA is transmitted. The location of a resource through which the D2D data will (or may) be transmitted may be indicated by only time, and the location of a frequency thereof may be implicitly indicated in connection with a location at which CI or SA is transmitted. Alternatively, the locations of the time and frequency resources may be explicitly indicated. For example, in the case of the locations of frequency resources, the location of a frequency resource which is transmitted first may be explicitly indicated, and location information of a subsequent frequency resource may be transmitted according to a predetermined frequency hopping pattern. Location information of the time resource may be transmitted by including, in the SA, a bit sequence explicitly indicating the location of a resource for transmission of a D2D signal.

The RA information may be resource patterns for transmission (RPT) of a D2D signal (In the following description, the RPT may be understood as a T-RPT among RPTs. If the T-RPT is used, a frequency resource region may have a specific hopping pattern in a subframe indicated in the T-RPT after being indicated during first transmission). That is, the RA information may be bits indicating a resource transmission pattern. The RA information may be padded to a specific state (e.g., with all 0s) or may not be included when the length of an ID is long or the number of RPTs needed is small (e.g., when the number of D2D subframes is a predetermined threshold or less, when the number of times of transmission is a predetermined threshold or less, or when the RPT may be sufficiently indicated with only an ID). The RPT will be described in more detail below.

Figure 5:
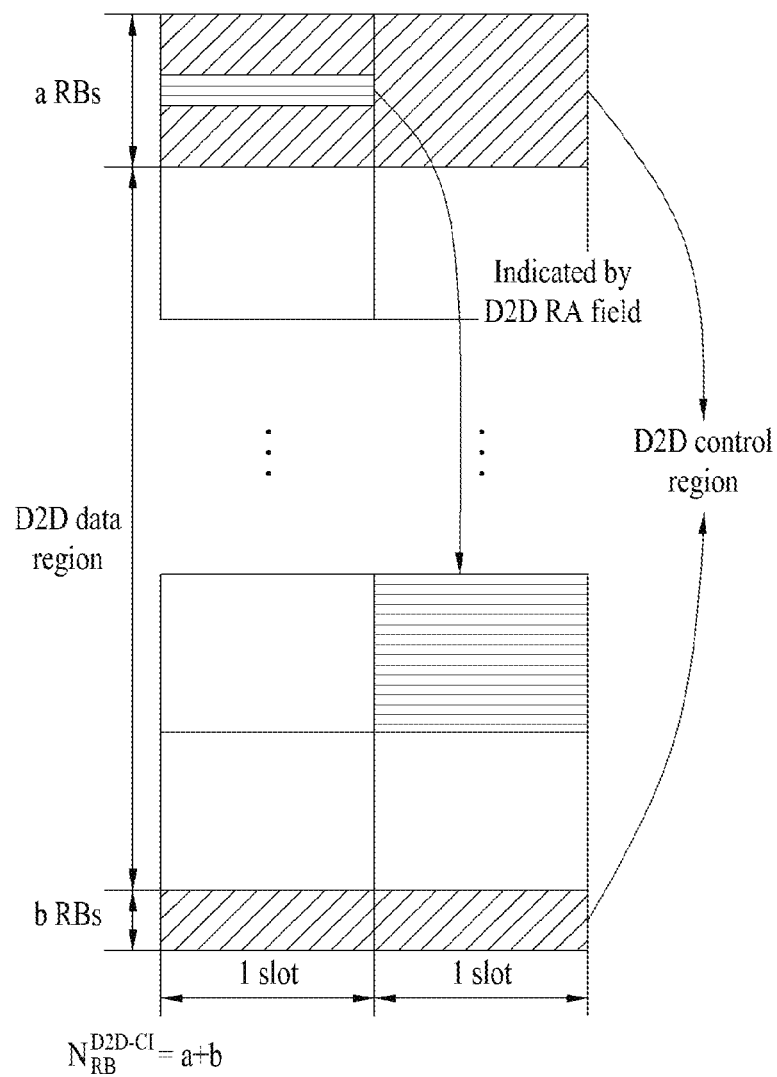
FIGS. 5 and 6 are diagrams illustrating information included in control information.

The RA information may be transmitted in an additional control channel separated from data to indicate RA information of a data channel. For example, as illustrated in FIG. 5, since D2D control channels similar to a PUCCH (which will be hereinafter referred to as a "D2DCCH") are located at both ends of a frequency band (or at a location of a specific subframe or RB which is determined or configured beforehand) and the D2DCCH includes an RA field of a specific UE, the RA information may indicate a frequency resource region, for transmitting D2D data, consecutive to a subsequent slot (or subframe) or a predetermined slot (or subframe), e.g., a +n subframe (or slot) (here, 'n' may be determined beforehand or may be set by a node which manages scheduling between eNBs or between D2D UEs).

Figure 6:
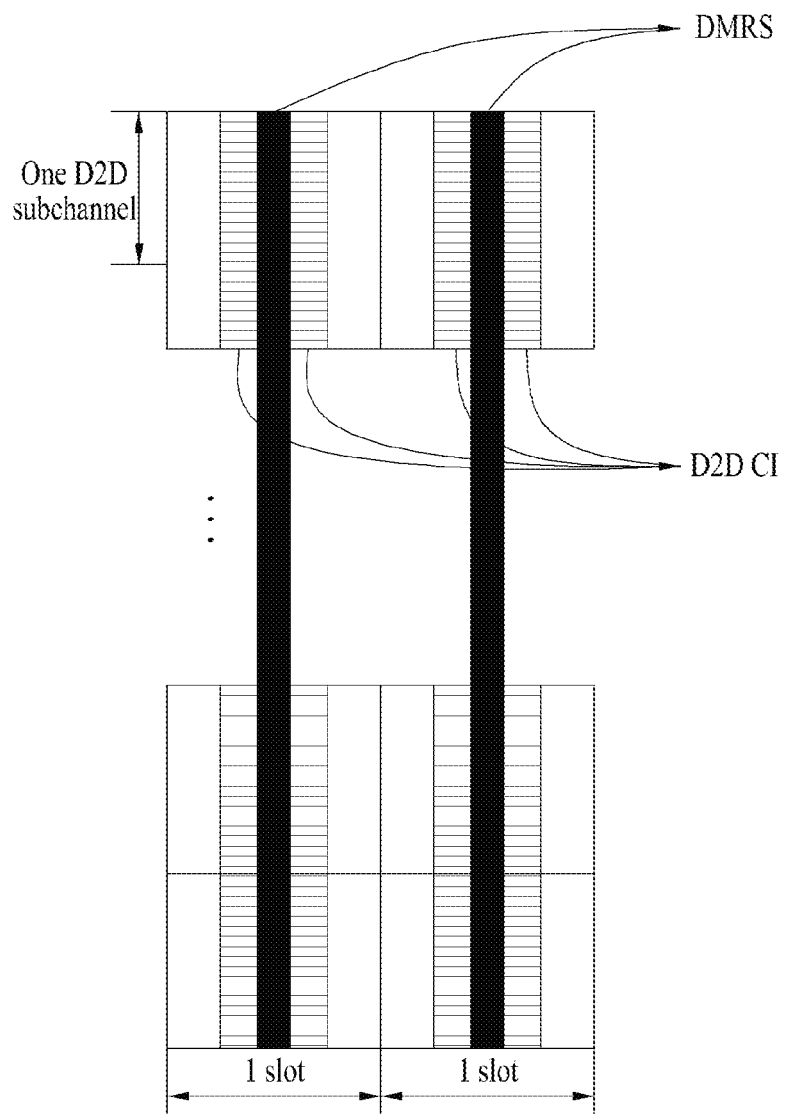

Alternatively, D2D CI may be multiplexed in a specific region of a data channel. Thus, a D2D reception UE may obtain the RA information by blind-decoding a D2D CI transmission region. Otherwise, the RA information may be obtained by performing energy detection to detect the D2D CI transmission region. For example, as illustrated in FIG. 6, a D2D data transmission unit may be sub-channeled into consecutive specific RB units. Information regarding a D2D sub-channel may be periodically transmitted in a D2D synchronization channel, a D2D system information channel, or a D2D broadcast channel. Thus, a D2D reception UE which decodes the information regarding the D2D sub-channel may know the information regarding the D2D sub-channel before the D2D data is received. When a symbol for transmission of D2D CI and a symbol for transmission of data are different from each other, a frequency band for transmission of the D2D CI may be different from a frequency band of the data. For example, a frequency band of the D2D CI may always be limited to 6 RBs or less. Otherwise, the D2D CI may be mapped to a specific symbol, similar to a PDCCH, and all REs corresponding to a whole system bandwidth may be used for mapping of the D2D CI. Otherwise, a bandwidth for transmission of the D2D CI may be configured beforehand by a D2D synchronization node or a cluster head. In this case, a predetermined set of symbols near a DMRS may be used to transmit the D2D CI. In the D2D CI, a set of consecutive REs in a frequency domain may be mapped to CI of one D2D link similar to the PDCCH. In this case, when an RE of one UE corresponds to more than one symbol, the D2D CI may be configured by consecutively selecting an RE in a subsequent symbol. UEs which receive such a D2D CI format may each blind-decode the symbol for transmission of the D2D CI to detect regions of other symbols to which D2D data is allocated.

b. MCS (Modulation and Coding Scheme)

After the SA is transmitted, an MCS to be used to transmit or receive a D2D-related signal (e.g., a D2D communication packet, etc.) in a scheduling assignment period may be included in the CI or the SA. Alternatively, the MCS may be information indicating an MCS of data which is currently transmitted. In this case, a D2D public safety service or a specific broadcast service may be limited to use only a specific MCS (a low MCS index, e.g., MCS 0) or only some MCSs (which are modulation techniques used when a UE exchanges a signal with a base station) (e.g., MCS indexes 0 to 9 using only QPSK modulation), so that a plurality of UEs may receive the D2D public safety service or the specific broadcast service. Otherwise, 64QAM may not be used and may remain in a 'reserved state' during transmission of a D2D signal. In this case, for D2D, a MCS indication bit length which is shorter than that used in the existing PUSCH may be used. Otherwise, the existing MCS indication bit number may be directly used, and unused MCS bits may be used to indicate the D2D CI or may remain in the 'reserved state' without being used for any purpose.

c. ID Information

Identification (ID) information of a transmission UE (group) and/or a reception UE (group) may be explicitly included in the CI or the SA. That is, since ID information related to a UE using the CI or the SA is included in the CI or the SA, a UE may determine whether the CI or the SA is available to the UE itself, thereby reducing unnecessary decoding. In other words, when a specific UE receiving a D2D signal determines that data is not transmitted from a desired UE, the UE may not decode a subsequent data packet, thereby conserving battery power. Such a D2D ID may include a packet ID (an application or group ID). Different packets may be transmitted from the same UE when one UE transmits a plurality of different packets, when one UE belonging to different groups transmits different data items, or when one UE generates and transmits D2D packets by using different applications. Thus, a packet, application, or group ID is included to identify the different packets transmitted from the same UE. In this case, a transmitted Tx UE ID, Rx UE ID, or group ID may be used to initialize a scrambling sequence of a D2D packet transmitted after an SA, determine a DMRS base sequence, or determine a DMRS CS/OCC, etc.

An ID may be information which is important to determine whether combining is to be performed or not during retransmission. For example, if a UE receiving specific data tries to combine the specific data with a log likelihood ratio (LLR) value (which was received but was not decoded and has thus been stored in a HARQ buffer) in a state in which a plurality of UEs simultaneously transmit D2D data, data reception performance may be degraded when the LLR value is combined with data received from another UE. ID information of the UE may be used to initialize a scrambling sequence of data or to set a DMRS base sequence.

The ID information may include a service ID (or an application ID). If a service (or application) ID was not obtained at a discovery stage (e.g., in the case of a D2D signal broadcast without performing discovery), the service ID may be information which is important to decode data, similar to the UE ID. For example, if one UE transmits data by using a plurality of applications (e.g., when for a public safety purpose, a photograph is transmitted together with voice), different data items belonging to the same UE ID should not be combined with each other during retransmission. A UE receiving D2D data may determine whether combining is to be performed after the service ID and the UE ID are detected.

The above ID information may be directly included in the D2D CI or SA but may be included in the CI or the SA in the form of a sequence obtained by performing a Hash function on only the above ID information or a combination of the above ID information and a different type of ID for efficient use of resources. For example, the UE ID and the service ID may be included in the D2D CI in the form of a sequence indicating IDs, the lengths of which are shortened through an additional Hash function, or the ID information may also be used as an input value of one Hash function to generate a sequence indicating a shortened ID. As described above, desired information may be more efficiently transmitted by including an ID in a sequence shortened through the Hash function rather than by directly including the ID in the D2D CI.

An ID indicated by an upper layer may be converted into a physical layer ID according to one of hashing, truncation, and a direct usage method, and be then transmitted. In this case, a plurality of IDs among the above IDs are combined. A portion of an ID to be included in the SA may be derived from one specific ID, and the other portion thereof may be derived from another specific ID.

A combination of a TX ID and an RX ID may be used in determining scrambling of a D2D channel, a DMRS sequence, a CS, etc. In particular, the combination of the TX ID and the RX ID may be useful when the number of bits to be transmitted, for an ID, in a D2DSACH is limited. To this end, both the Tx UE ID and the Rx UE ID may be included in an ID field and transmitted in the D2DSACH. For example, the TX ID and the RX ID which are each 8 bits long may be transmitted in the D2DSACH, and 16 bits which are a combination of the TX ID and the RX ID may be used to initialize a scrambling sequence. In the case of D2D broadcasting, the Rx UE ID may not be used. In this case, the Rx UE ID may be set to a predetermined specific bit sequence. For example, in the case of broadcasting, an 8-bit ID sequence derived from a transmission UE ID may be transmitted as a Tx UE ID in the D2DSACH, and an Rx UE ID may be set to '00000000' and transmitted. As another example, in the case of group-casting, the Rx UE ID may be set as a group ID.

The whole or a portion of a (physical layer) ID transmitted in the SA (D2DSACH) may be randomly selected by a transmission UE. In particular, only a portion corresponding to a transmission UE ID may be selectively and randomly selected and transmitted. Alternatively, the physical layer ID may be generated from an upper layer ID. The upper layer ID may be used as a seed value of a random sequence generator. Otherwise, an ID may be randomly generated regardless of the upper layer ID. The reason why an ID to be included in the SA is randomly set is to minimize collision between scrambling sequences or DMRSs of UEs when the scrambling sequences are generated or DMRS sequences are selected using an ID, or to prevent collision between RPTs when the RPTs are determined using an ID. Methods of randomly setting an ID to be included in the SA may include (i) randomly setting an ID in an SA transmission period, (ii) maintaining a randomly determined ID during a predetermined SA period and randomly changing the ID after the predetermined SA period, and (iii) continuously transmitting a randomly determined ID, and randomly selecting an ID only when feedback is received from a specific UE or base station or when a transmission UE recognizes that the randomly determined ID is inappropriate as a result of sensing resources. In one embodiment, an x-bit ID is transmitted in the SA. This ID may be randomly generated. A target or destination ID may be transmitted in the form of masking CRC of the SA.

The above-described ID information transmitted in the SA may be used for CRC masking which is performed to determine whether D2D data or a D2DSACH is exactly received. In this case, an ID of a D2D synchronization signal may also be used. Here, the ID of the D2D synchronization signal means the ID of a synchronization signal transmitted from or relayed by a corresponding node when a specific UE or eNB transmits the D2D synchronization signal. For example, when the existing cellular synchronization signal reuses the D2D synchronization signal, about 500 IDs may be present. In this case, some of CRC masking bits may be masked by a hashed sequence of an ID indicated (signaled) by a physical layer or an upper layer and the other CRC masking bits may be masked by a hashed sequence of another specific ID. For example, assuming that there are 24 CRC bits, N predetermined bits may be masked by a sequence hashed from a UE ID and the other (24-N) bits may be masked by a sequence hashed from a service or group ID. In another embodiment, CRC bits may be double-masked by 24-bit sequences hashed from a plurality of IDs (e.g., CRC bit XOR hashed UE ID sequence XOR hashed service ID sequence).

A predetermined Hash function may be used for the above ID for CRC masking but CRC bits may be used as a masking bit sequence by obtaining a 'truncated bit string' at a predetermined location from an ID indicated beforehand by a physical layer or an upper layer. In this case, an ID truncation location on an ID signaled beforehand by the physical layer or the upper layer may have been determined. For example, when a Tx UE ID and a target ID are indicated by an upper layer, a bit sequence for CRC masking may be generated from some bits of each of the Tx UE ID and the target ID. The length of the bit sequence for CRC masking may be different from that of an ID included in a control channel (which may be a separate D2D control channel or an SA). Thus, a method of performing truncation/hashing on an ID indicated by an upper layer for CRC masking and a method of truncating/hashing an upper layer ID to generate an ID to be transmitted in a D2D control channel may be different from each other.

When a bit sequence for CRC masking is generated or an ID sequence to be transmitted in the D2D CI is generated, some or all of a transmission ID (source L2 ID), a destination L2 ID, and a synchronization source ID indicated by an upper layer may be used. Such an upper layer ID may be differently converted into a physical layer ID according to group-casting/broadcasting/unicasting. For example, a physical layer ID bit sequence may be generated from only a source ID in the case of broadcasting, and may be generated from both of the source ID and a group (destination) ID in the case of group-casting/unicasting. In the case of broadcasting, the physical layer ID bit sequence is generated using only the source ID. Here, all physical layer ID bit sequences may be generated from the source ID, some physical layer sequences may be hashed/truncated from the source ID or a group or transmission ID, and the other physical layer ID sequences may be set to predetermined fixed values (e.g., all 0s or all 1s). For example, in the case of group-casting, a physical layer ID sequence may be generated by using both of a ProSe L2 source ID and a ProSe L2 group ID as a target (destination) ID. In the case of broadcasting, some physical layer ID sequences may be used as broadcast IDs by designating a specific bit string of the ProSe L2 group ID and the other physical layer ID sequences may be set to all zeros. As another example, a bit sequence for CRC masking of a scheduling assignment (SA) may be masked by some or all of a synchronization source ID, a destination (specific UE or UE group) ID, and a source (Tx) ID. For example, some CRC bits may be masked by hashing, truncating, or directly using the synchronization source ID by using a synchronization source ID and a destination ID, and the other CRC bits may be masked by hashing, truncating, or directly using the destination ID. As another example, CRC bits included in the SA may be masked using the synchronization source ID. If the length of the synchronization source ID is shorter than that of the CRC bits included in the SA, the other CRC bits may be padded with 0s or be filled by repeating the synchronization source ID, or the other CRC bits may be masked by a bit sequence indicating the number of antenna ports (CRC masking bits vary according to the number of APs).

The above-described CRC may be CRC for determining whether CI is exactly transmitted in a separate channel (a physical layer signal) when the CI is transmitted in the separate channel, or may be CRC for determining whether a data channel (a physical layer signal of a data transmission region) linked to the control information is exactly transmitted. In this case, the length of CRC bits for determining whether the D2D CI or SA is exactly received and the length of CRC bits for determining whether data is exactly received may be different from each other. For example, the CRC bits for the SA may be 16 bits long and the CRC bits for the data may be 24 bits long. In this case, 16 bits should be hashed or truncated from an ID indicated by an upper layer in the SA, and 24 bits should be hashed or truncated from an ID indicated by the upper layer in the data. In this case, a method of generating a bit string for masking the SA and a method of generating a bit string for masking the data may be different from each other. For example, a bit string for CRC masking may be generated from both of a source (or Tx) ID and a destination ID (Rx or target ID) in the case of the SA (or the data), whereas a bit string for CRC masking may be generated from the source (or Tx) ID, a destination (UE or group) ID, a synchronization source ID, or a combination of two or more IDs among the source (or Tx) ID, the destination (UE or group) ID, and the synchronization source ID in the case of ID of the data (or the SA).

d. NDI (New Data Indicator)

When HARQ retransmission is performed between D2D links, an NDI may be transmitted to differentiate between data to be retransmitted and data to be newly transmitted. In this case, the NDI may be transmitted in the form of 1-bit information but may be combined with a UE TX/RX ID or different control information (A/N, CQI, or the like) and transmitted in a new form. For example, the NDI may be used together with the UE TX/RX ID and/or an application/service ID as input values of a predetermined Hash function, and an output of the Hash function may be transmitted in the D2D CI. As another example, an NDI field may be extended to M bits. One of numbers which may be expressed with the M bits may be selected and transmitted as a specific random number when a UE transmits new data, and another random number may be selected and transmitted when data is changed, so that a UE which is receiving D2D data from a plurality of UEs may differentiate data received from a specific UE from data received from the other UEs and differentiate this data from data to be retransmitted while the UE decodes the data received from the specific UE.

e. Information Related to a Plurality of Antennas

The number of antenna ports (APs), the MIMO scheme, precoding information, and/or a precoding granularity may be included in the CI or the SA when multilayer transmission or diversity transmission using multiple antennas is allowed in D2D.

The above information may be transmitted in different fields. Otherwise, the above information may be embodied as indicating a specific MIMO scheme or the number of ports for CRC masking a data region. In this case, the above information may be set to be always transmitted in a subframe when the number of APs is two or more, and be set to be transmitted in an FSTD when the number of APs is four, so that a diversity scheme may always be used for reliable data transmission/reception since D2D is more influenced by interference than a cellular environment. When precoding is applied to D2D communication, the precoding information may be included in the D2D CI. In this case, the precoding information and rank information may be included separately in the D2D CI, or a PMI and an RI may be expressed together as one information item for efficient use of resources (when a codebook including a plurality of ranks is included in one precoding set). When the number of APs is two or more, precoding is applied but random precoding may be applied. When random precoding is applied, a precoder may be changed in time or frequency units. A granularity to which precoding is changed may be determined beforehand. It may be prescribed that random precoding (precoder/beam cycling) should always be used when the number of APs is two or more.

When a transmission UE uses multiple antennas, the number of APs, the precoding information, and/or the MIMO scheme may be included. When multi-antenna transmission is used, (random) precoding may be used in a D2D data channel. In this case, a precoding granularity of time/frequency resources in which the same precoding is used may be transmitted in the D2DSACH. When multi-antenna transmission is not used, the precoding granularity may not be included in the D2DSACH or the D2DSACH may be padded with zeros. The number of APs may not be additionally indicated, and may be indicated such that masking bits vary according to the number of ports for CRC.

f. RV (Redundancy Version)

When HARQ retransmission is employed in D2D data communication, an RV may be included in the CI or the SA. However, when the RV is transmitted in a predetermined order (for example, RV 0→2→3→1) similar to a current LTE uplink, the RV may not be included in the CI or the SA even when HARQ retransmission is employed. Otherwise, the RV may be combined with specific information of the D2D CI or the SA described above and mapped to an RE, or some fields of the D2D CI may be used to indicate the RV (e.g., a 2-bit RV). For example, when some states of an MCS field are not used in D2D communication, the RV may be transmitted by borrowing a portion of the MCS field. Otherwise, when the RV is transmitted in a separate field, the RV and the NDI may be combined with each other, expressed as one state on a constellation diagram, and mapped to a control channel.

g. Demodulation Reference Signal (DMRS) Sequence Information

Similar to LTE uplink, when SC-FDMA is employed in D2D communication, a DMRS of a Zadoff-Chu (ZC) sequence base is likely to be used. To simplify the DMRS, a ZC-based DMRS such as a cellular DMRS may be used. In this case, a ZC base sequence may be determined based on a cell ID but a base sequence having a different ID from the cell ID may be used to be differentiated from the cellular DMRS for an out-coverage case or an in-coverage case. In this case, a DMRS base sequence between D2D UEs may be directly indicated or a predetermined base sequence may be used. More specifically, some or all of DMRS cyclic shift, a DMRS base sequence ID, whether a DMRS group/sequence is hopped or not, length, and an OCC may be directly indicated by including the same in the D2D CI. In this case, a DMRS for decoding the D2D CI may be defined differently from a DMRS for data. For example, a predetermined DMRS format may be used as a format of the DMRS for decoding the D2D CI. Otherwise, the D2D CI may have been coded using differential coding for performing decoding without the DMRS.

h. Whether Frequency Hopping (Hopping Flag) is to be Used, and NU1_Hop

In a frequency domain, a hopping flag and NU1_hop may be transmitted in the CI or the SA. In this case, when frequency hopping is not used, corresponding bits may not be included or may be padded to a specific state (e.g., with all zeros). However, when a system bandwidth and/or a band available for D2D communication is relatively low, e.g., when it is less than or equal to a threshold, the above information may not be included in the CI or the SA. This is because a frequency hopping gain may be almost zero when the frequency domain is small.

i. CP Length

If a CP length is not indicated by a D2DSS or a PD2DSCH, the CP length may be indicated by the D2DSACH. In this case, a CP length of the D2DSACH should be determined. One of the following methods may be used. (i) The CP length to be used in the D2DSACH may be signaled beforehand by an upper layer (e.g., an RRC signal) or a physical layer signal (SIB or (E)PDCCH). (ii) A CP length used in a PSS/SSS of a serving cell may be used as the CP length of the D2DSACH. (iii) A predetermined CP length may be used. The CP length may be fixed beforehand to one of an extended CP length and a normal CP length. (iv) A CP length may be indicated by a synchronization source, i.e., the D2DSS or the PD2DSCH.

If a plurality of signals are indicated to overlap with each other, priority should be determined. For example, any synchronization source may not be detected by a UE out of coverage in the vicinity thereof at an initial stage. In this case, the extended CP may be basically used. If the synchronization source is detected, a CP length indicated by a D2DSS or a PD2DSCH transmitted from the synchronization source is used. Thereafter, when a signal of an eNB is observed in the vicinity of the UE, a CP length indicated by a PSS/SSS of the eNB is used. When instructions are smoothly received from the eNB, a CP length for the D2DSACH, which is indicated by the eNB, is used. That is, when a CP length for a predetermined D2DSACH is set and another synchronization source or an explicit signal indicating a CP length is received, it may be prescribed that the CP length should be used.

When the CP length of the D2DSACH is determined as described above, a CP length of data indicated by the D2DSACH may be indicated by transmitting bits indicating the CP length in the D2DSACH. In this case, the D2DSACH and D2D data may be different from each other in CP length. In this case, additional bits may be transmitted in the D2DSACH but an unused state of another field may be borrowed and transmitted. Otherwise, the CP length used in the D2DSACH may be directly used. In this case, the CP length used in the D2DSACH is directly used as a CP length of data. A D2D signal reception UE may detect a CP length by blind-detecting RS intervals of the D2DSACH or a D2D signal or determine the CP length of the data by detecting a CP length of a synchronization source or an eNB linked to the D2DSACH.

An unused bit field of the CI information described above may not be fixed to a specific state and may be used for another purpose. For example, the bit field may be used to indicate an RPT when frequency hopping is not used.

Next, the following may be included, as information which is not related to data demodulation, in the CI or the SA.

j. HARQ ACK/NACK

In the case of HARQ ACK/NACK, an ACK/NACK signal may be included in the D2D CI for only a specific service. For example, in the case of information broadcast in an emergency circumstance, D2D data communication may be performed without using the ACK/NACK signal so that the information may be rapidly spread. However, in the case of a social network D2D service or the like, data communication may be performed stably by including the ACK/NACK signal in the D2D CI.

k. CQI

When the MCS described above is fixed to a specific service, feeding back of a CQI may be omitted in the service. Alternatively, even if the MCS is fixed, the CQI may be fed back to set transmission (Tx) power. A CQI bit used in this case may be one bit and be included in the D2D CI to determine whether it is greater than a predetermined threshold.

l. PMI, RI

When multi-antenna transmission is allowed in D2D communication, a PMI and an RI may also be included in the D2D CI.

m. UE Tx Power

Information regarding UE transmission (Tx) power of a UE transmitting D2D data may also be included in the D2D CI. In this case, a D2D reception UE may determine an amount of power to be used and an amount of power to be transmitted to the transmission UE when the determined amount of power is used, based on channel reciprocity. Thus, the UE Tx power may be useful for the D2D reception UE to set Tx power.

n. Transmission Power Control Command (TPC)

When the SINR of a UE receiving D2D data is low, a D2D TPC may also be included in the D2D CI. A bit field of the TPC may be expressed with 2 bits but may be configured to be greater than 2 bits if needed.

o. Scheduling Request (SR)

An SR between D2D UEs may be used in the form of a warning signal requesting a predetermined (or randomly selected) specific UE to allocate resources or to first use a specific resource in a situation in which an eNB is difficult to access, e.g., an out-of-network coverage situation or a partial network coverage situation.

Some of the above information that may be included in the D2D CI may be transmitted in a separate D2D control channel format, and the other information may be transmitted by being multiplexed to a D2D data channel. For example, information such as the RA information may be indicated via a separate control channel and the other information (e.g., the NDI, the MCS, etc.) may be piggy-backed on a data channel.

Some of the above information is information related to data demodulation (e.g., the RA information, the MCS, the NDI, the RV, the ID, etc.). Some of the above information is information related to feedback (e.g., the CQI, the PMI, the A/N, etc.) or information which is not related to data demodulation (e.g., the SR). In this case, the information which is related to data demodulation and the information which is not related to data modulation may be transmitted in different frames. For example, some or all of the information related to data demodulation may be transmitted by being piggybacked on data and the information related to feedback may be transmitted in an additional format.

RPT Specification

As described above, the CI or the SA may include an RPT which is a combination of time/frequency resources that a transmission UE uses. Hereinafter, the term "RPT" may be understood as resource patterns for data transmission, and particularly, a T-RPT. If the T-RPT is used, a frequency resource region may have a specific hopping pattern in a subframe indicated in the T-RPT after the subframe is indicated during first transmission. A UE receiving the RPT may receive a D2D signal in time/frequency resources (e.g., a subframe) indicated in the RPT. A bit sequence indicated in an ID field and an RPT field may be a simple bitmap of a subframe for transmission of the D2D signal after the SA is transmitted. For example, 1's position may be understood as the index of a subframe via which a UE transmitting the D2D will transmit (will probably transmit) the D2D signal. In the following description, the term 'RPT indication bit sequence' is used. An RPT bit sequence may include only an ID included in the SA. Otherwise, when an additional bit field indicating the RTP is included in the SA, the ID and the RPT bit sequence may be understood together as the RPT indication bit sequence. Otherwise, a bit sequence indicating the RPT, which is independent of the ID, may be included in the SA. In this case, the RPT bit sequence may be understood as the RPT indication bit sequence. A set of bit sequences transmitted in the SA and used to indicate the RPT may be understood as the RPT indication bit sequence.

If either an SA transmission period or an SA allocation section (the number of D2D subframes configured at SA transmission intervals) and the length of a bit sequence indicating the RPT are different from each other, a problem may occur. For example, when L D2D subframes are present between SA allocation/transmission periods and the number of bits indicating the RPT is M (here, M≤L), a way of indicating a transmission pattern in the other (L−M) subframes may be a problem. In this case, when the length of the RPT indication bit sequence is M, the other L subframes are filled by simply repeating M bit sequences. If L is not a multiple of M, an RPT may be generated by sequentially filling the other L subframes with the other bit sequences. In other words, when the number of subframes included in a scheduling assignment period is greater than the number of bits of the RPT, at least one bit of the RPT may indicate whether transmission of the D2D signal in two or more subframes is to be allowed or not. In this case, if the number of subframes included in the scheduling assignment period is n times the number of bits of the RPT, a UE may repeatedly use the RPT in the scheduling assignment period. If the number of subframes included in the scheduling assignment period is not a multiple of the number of bits of the RPT, only a portion of the RPT is used (the bits of the RPT are sequentially used) when the RPT is lastly repeated. The number of bits of the RPT to be used when the portion of the RPT is used may be equal to a result of dividing the number of subframes included in the scheduling assignment period by the number of bits of the RPT.

As another method, when the length of the RPT indication bit sequence is 'M', the RPT indication bit sequence represents a bitmap of first M subframes, and an RPT for the L subframes is generated by filling a bitmap of subsequent subframes with the other frames by hopping from the bitmap of the first M subframes to another RPT indication bit sequence. In more detail, when the RPT indication bit sequence has been indexed and an RPT indication bit sequence for the first M subframes is indicated through the SA, an RPT for the other (L−M) D2D subframes is generated according to a predetermined index hopping pattern. That is, an additional diversity gain may be obtained or collision may be randomized by hopping between RPTs according to time.

The above methods may be expanded and applied to a method (which will be described below) according to the same principle when an SA transmission period and the number of subframes indicated by the RPT indication bit sequence are different from each other. Even if the RPT indication bit sequence is not a simple bitmap, the above methods may be applied to generate an RPT for the other (L−M) subframes when a D2D subframe length M indicated by the RPT indication bit sequence is less than an interval L between subframes transmitting the SA (the number of D2D subframes between SA transmission periods).

Figure 8:
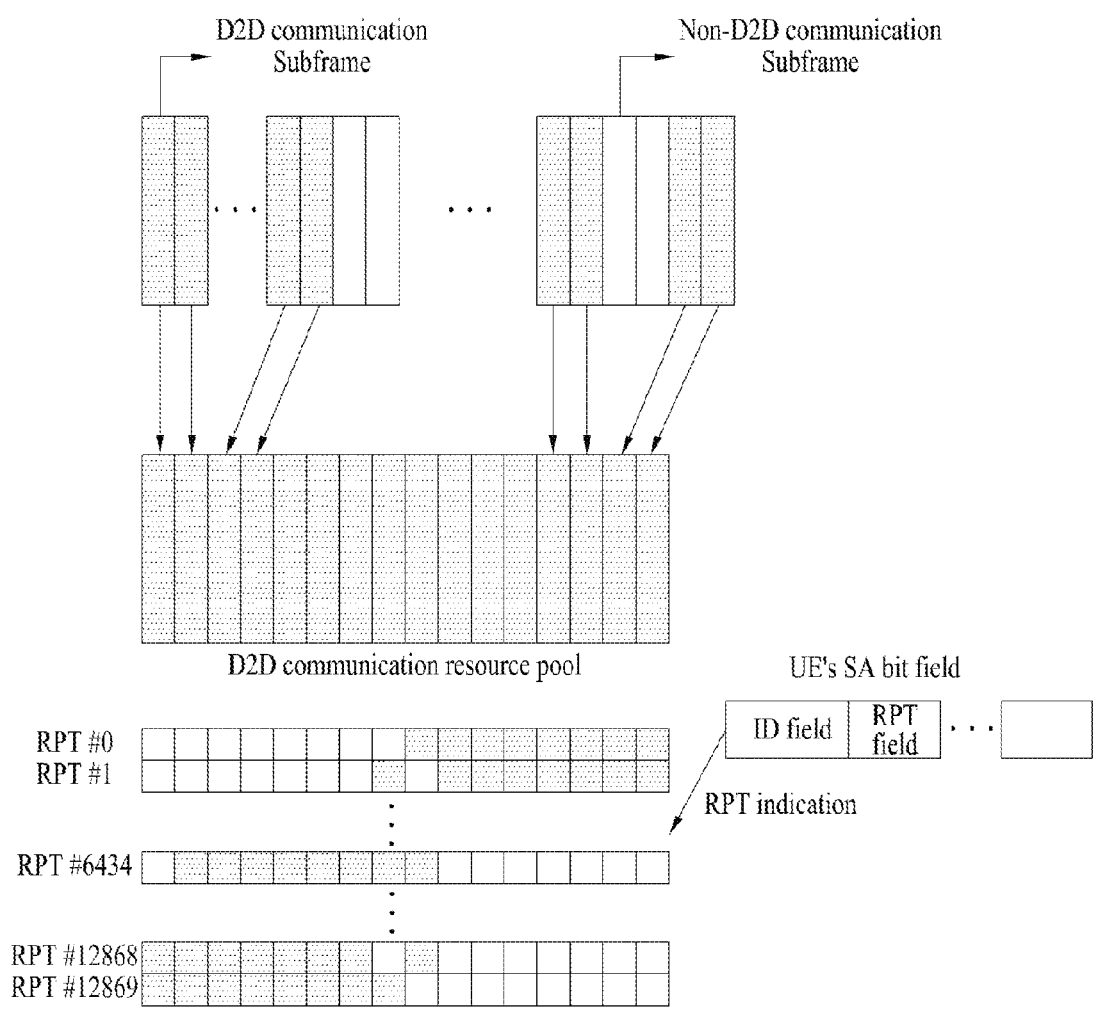

As illustrated in FIG. 8, when the transmission opportunity size for all UEs is M and the number of subframes of a D2D pool is N, a bit sequence may be M-out-of-N code (Code in which M binary codeword bits among N binary codeword bits are set to 1 and the other binary codeword bits are set to 0. Codewords each having a Hamming weight of M are generated from the code). An RPT set of M weight may be $\{(\beta 0, \beta 1, \ldots, \beta K-1\}$. Here, $\beta_r$ denotes an $r^{th}$ RPT sequence that may be expressed with a binary bit sequence having a length N. Here, $$K = \binom{N}{M} = \frac{N!}{M!(N-M)!}.$$

In the M-out-of-N code, 1's position represents a data transmission position, and 0's position represents a non-data transmission position. When each bit sequence and one of subframe indexes in a D2D resource pool are mapped in 1:1 correspondence, all 1s' positions are used to indicate subframes in the resource pool. When a group of subframe indexes and '1' of the RPT are mapped in 1:1 correspondence, 1's position is used to indicate an index of a subframe group in the resource pool. For example, when a D2D signal is transmitted by bundling subframes, the bundled subframes may be understood as '1' of a bit sequence.

In detail, when N=4 and M=2, the following RPT set may be expressed as codewords of the M-out-of-N code.

RPT set={0011, 0101, 0110, 1001, 1010, 1100}

As another example, when N=5 and M=3, an RPT set is as follows:

RPT set={00111, 01011, 01101, 01110, 10011, 10101, 10110, 11001, 11010, 11100}

In some cases, only K1 RPT set indexes among K RPT set indexes may be used. Only the K1 RPT set indexes may be used when all RPT sets cannot be expressed with the size of an RPT bit field (including an ID field) included in the SA. In this case, a method of selecting K1 RPT sets among K RPT sets is needed. For convenience of explanation, an original codeword set of the M-out-of-N code is referred to as an RPT mother set. It is assumed that a bit sequence of a mother set $$\{\beta_0, \beta_1, \ldots, \beta_{\binom{N}{M}-1}\}$$

is indexed according to the following rule.

Here, '$\beta_r$' denotes an $r^{th}$ RPT sequence.

$$r = \sum_{i=0}^{M-1} \left\langle \begin{matrix} N-s_i \\ M-i \end{matrix} \right\rangle,$$

where $\{s_i\}_{i=0}^{M-1}$, ($1 \le s_i \le N$, $s_i < s_{i+1}$) contains sorted indexes for 1's positions in $\beta_r$ and $$\left\langle \begin{matrix} x \\ y \end{matrix} \right\rangle = \begin{cases} \binom{x}{y} & x \ge y \\ 0 & x < y \end{cases}$$

is an extended binomial coefficient, resulting in a unique label $$r \in \left\{0, \ldots, \binom{N}{M}-1\right\}.$$

For convenience of explanation, in this indexing method, bit sequences of the mother set may be understood as being indexed in ascending order according to the sizes thereof when the bit sequences are converted into decimal numbers. However, the concept of the present invention may be extended to a case in which the bit sequences are indexed in descending order. It is a main point that each bit sequence is indexed to minimize a Hamming distance between two sequences, so that the Hamming distance may increase when subsets are selected from the mother set at a predetermined interval at a later time and thus an index difference therebetween increases.

According to another embodiment, an indexing order may be set to a sequence selection to be described below. When the indexing order is set to the sequence selection order, K1 RPT subsets may be selected according to the index order.

The following methods may be used to select K1 (≤K) indexes from the mother set.

A subset configuration may be signaled by a network or a preconfigured subset may be used. K1 set indexes may be transmitted to a D2D UE through an upper layer signal or may be preconfigured set indexes.

Subsets may be generated by selecting K1 bit sequences from the mother set in an order in which the K1 bit sequences are indexed.

Otherwise, bit sequences spaced the same distance from one another may be selected from the mother set in order to maximize a minimum Hamming distance of an RPT set. However, when a subset size K1 is not a divisor of a mother set size K, a rule of selecting bit sequences spaced the same distance from one another is difficult to apply. The following method may be used to select indexes spaced the same distance from one another if possible.

When the existing mother set indexes 0, 1, . . . , K−1 are divided by 'K', K representation points 0/K, 1/K, . . . , K−1/K may be obtained. Similarly, when an index of an RPT subset is divided by a set size, 0/K1, 1/K1, ..., (K1−1)/K1 may be obtained. When a representation point on a $j^{th}$ RPT subset is located between an $i^{th}$ representation point and an $(i+1)^{th}$ representation point on the mother set, i.e., when $(i-1)/K \le (j-1)/K1 < i/K$, an $i^{th}$ bit sequence of the mother set is used as $j^{th}$ bit sequence of the RPT subset.

In other words, the above method may be expressed as selecting an index $$\left\lfloor \frac{K}{K1} i \right\rfloor, i \in \{0, \ldots, K1-1\}$$

from the mother set.

The above method is designed to select subsets spaced the same distance from one another if possible when subsets are selected from a mother set. When all UEs randomly select an RPT, a minimum Hamming distance between bit sequences selected according to this method is maximized.

Figure 7:
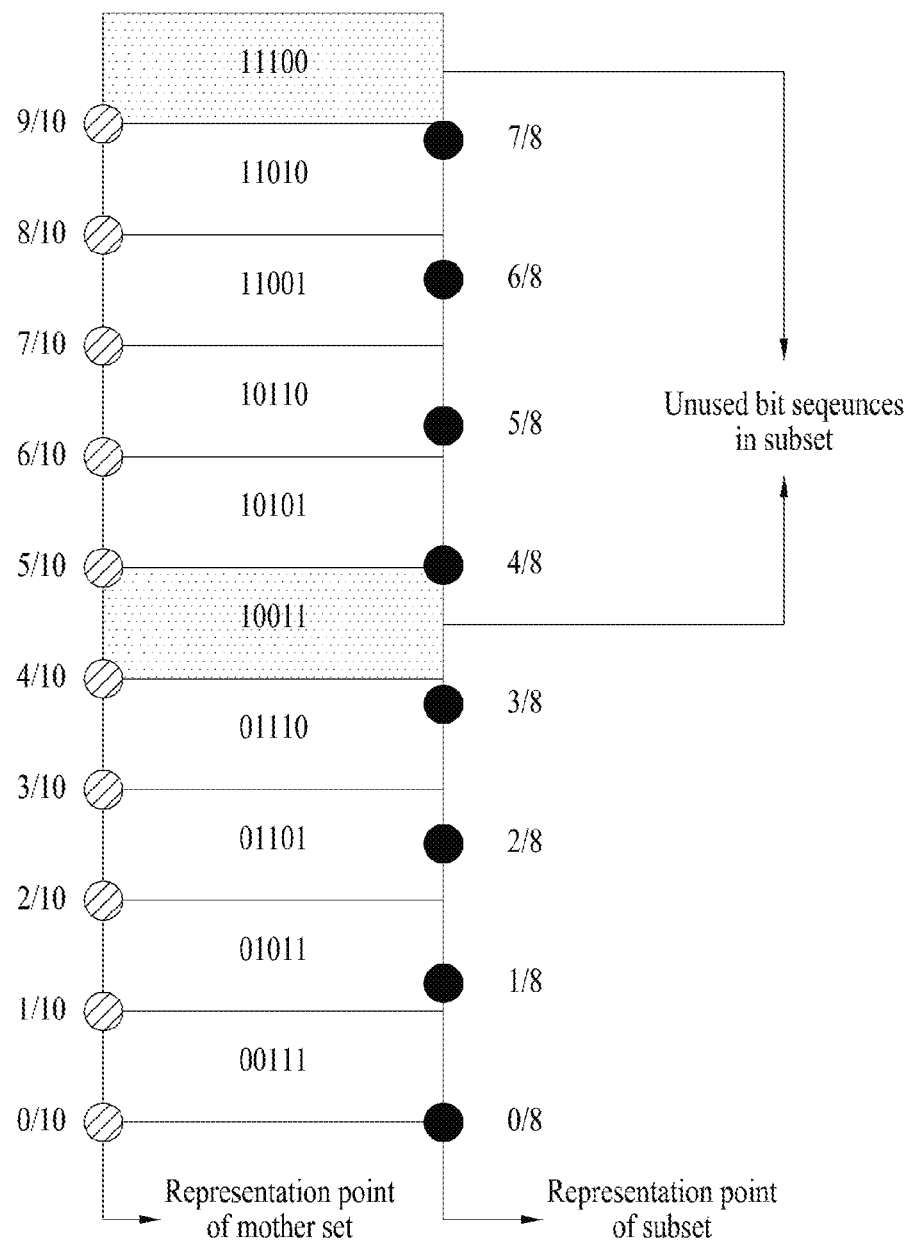
FIGS. 7 to 9 are diagrams illustrating resource patterns for transmission.

In detail, when N=5, M=3, and K1=8, eight sequences should be selected from the mother set (K=10). FIG. 7 illustrates the positions of representation points of an RPT set between representation points on a mother set. Since the distances between the representation points of the RPT set are greater than those of the representation points of the mother set (K≥K1), a probability of selecting the same bit sequence from the RPT set is zero. Table 1 below shows bit sequences which are finally selected according to the above method.

TABLE 1

| Index | Bit sequence |
|---|---|
| 0 | 00111 |
| 1 | 01011 |
| 2 | 01101 |
| 3 | 01110 |
| 4 | 10101 |
| 5 | 10110 |
| 6 | 11001 |
| 7 | 11010 |

The above method may be modified as will be described below.

According to a first method, $$\left\lfloor \frac{K}{K1} i \right\rfloor + \alpha, i \in \{0, \ldots, K1-1\}.$$

That is, a predetermined offset α may be applied when subsets are selected from a mother set. Bit sequences spaced the same distance from one another are selected form the mother set by applying the predetermined offset α. The offset may be in a range of 0 to floor(K/K1)−1. The offset may be a predetermined value. Alternatively, the offset may be a value configured by an eNB or another UE. For example, the eNB may instruct a specific UE or a specific UE group to use a specific offset. Otherwise, the offset may be set in connection with a synchronization source ID such that different RPTs are employed between synchronization groups. Otherwise, the offset may be set in connection with the synchronization source ID and/or a hop count such that different RPTs are used between different hops. For example, when K=20 and K1=4, 0, 1, 2, 3, or 4 may be considered as the offset. An RPT subset is {0, 5, 10, 15} when the offset is '0', and is {1, 6, 11, 16} when the offset is 1.

According to a second method, $$\left\lceil \frac{K}{K1} i \right\rceil + \alpha, i \in \{0, \ldots, K1-1\},$$

which is a modified version of a function selected from a mother set, may be used. That is, a ceiling function is used rather than a floor function. Similarly, the above-described offset α may be further applied in the second method.

A specific RPT may be determined based on an ID included in the SA and an RPT bit field. In this case, when the ID has a property of being hardly changed and the RPT bit field has a property of being relatively easily set by a transmission UE, RPT sets may be grouped based on each bit field.

One of three methods illustrated in FIG. 8 may be used for grouping of the RPT sets.

Figure 9:
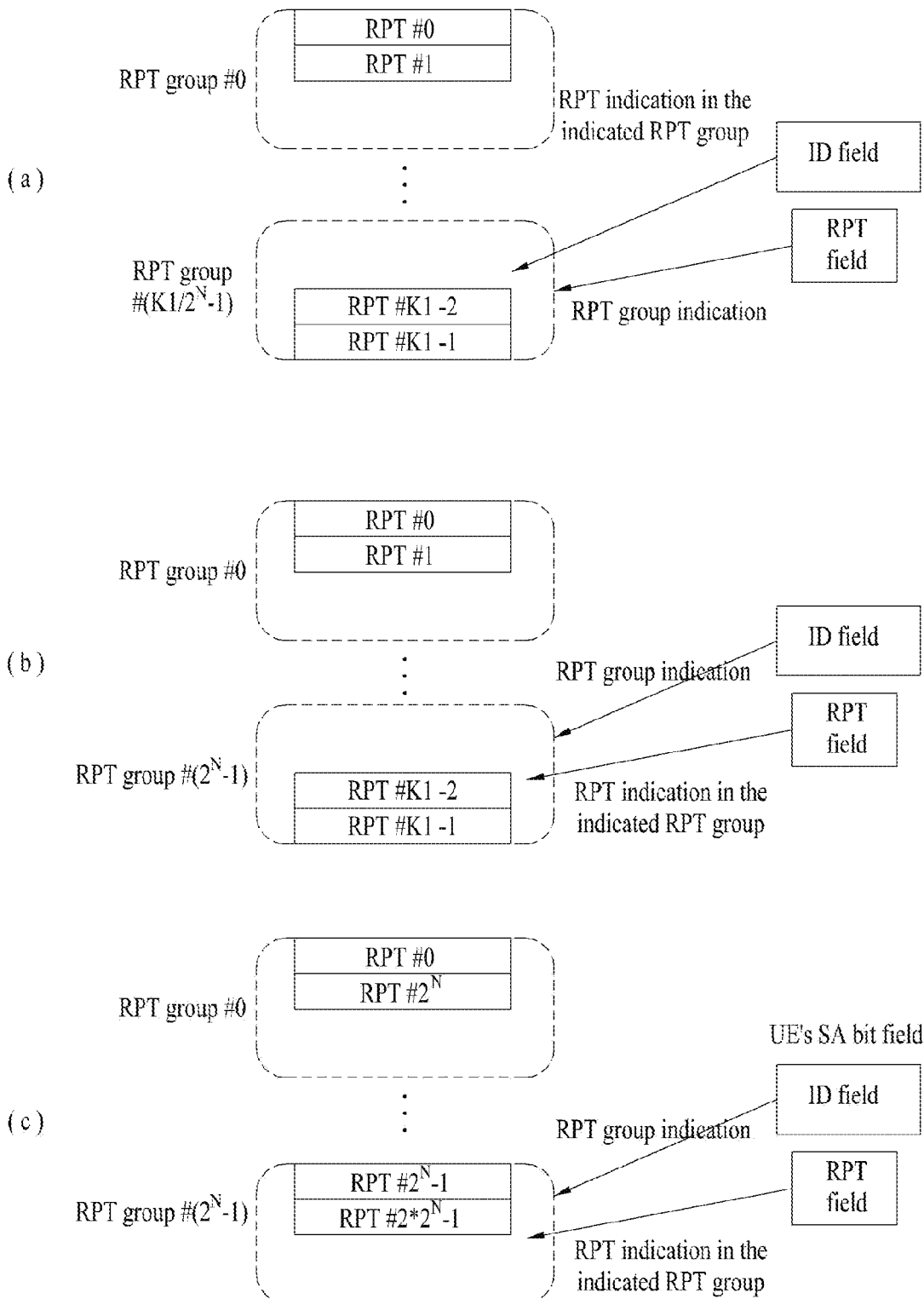

Referring to FIG. 9(a), when the length of an ID included in an SA is 'N' and an RPT set size is 'K1', $$\frac{K1}{2^N}$$

RPTs may be sequentially grouped. In this case, RPT indication bits included in the SA may be used to indicate a group to which an RPT of a specific UE belongs. In this case, an ID field is used to indicate an RPT to be used in the group, so that different RPTs may be indicated with the RPT indication bits if possible. If a UE does not appropriately transmit data due to collision, different resources may be selected if possible by differently set RPT bits.

As illustrated in FIG. 9(b), when the length of an ID included in an SA is 'N', the ID may be used to indicate an RPT group and a bit sequence of an RPT field may be used to indicate a specific RPT in the RPT group.

FIG. 9(c) illustrates a case in which when the length of an ID included in an SA is 'N', the ID is used to indicate an RPT group and a bit sequence of an RPT field is used to indicate a specific RPT in the RPT group. In this case, in order to select RPTs which are distant from each other with only RPT bits if possible, RPTs which are distant from each other may be classified as one group during grouping of RPT sets. In one embodiment, when an N-bit ID is transmitted in an SA and L RPT bits are transmitted, an RPT set size is $2^{L+N}$. In this case, one group is formed by collecting RPTs spaced a distance of $2^N$ from each other, and is indicated using the ID transmitted in the SA. Thereafter, a specific RPT is indicated using RPT bits included in the SA.

A subframe indicated by an RPT indication bit sequence may be a general subframe without classifying the subframe as a D2D subframe or a non-D2D subframe. In this case, when a D2D subframe is indicated by a different signal, an index of a subframe through which a D2D signal is to be actually transmitted may be indicated by performing a logic AND operation on D2D subframe indication bits and the RPT indication bit sequence.

The above-described RPT may be indicated according to a method which will be described below.

In mode I in which a UE directly receives an instruction regarding a resource region from a base station, an eNB may indicate an ID and RPT bits, which are to be transmitted in an SA, in a D2D SA grant. In this case, an ID sequence transmitted in the SA and/or a sequence of an RPT bit field transmitted in the SA (a bit field indicating specific ID and/or RPT) may be explicitly included in the D2D grant. Otherwise, a bit sequence of a D2D-RNTI may be hashed, or an ID sequence and/or an RPT bit field which is to be transmitted in the SA may be generated using some bits (e.g., lower N bits). Here, the "D2D-RNTI" means an ID signaled beforehand to differentiate D2D control information from different control information. The RNTI is used to mask CRC bits of the D2D control information. In this case, a portion of the ID to be transmitted in the SA may be generated from the RNTI and the other ID may be generated based on a target ID (or a group ID). Here, the ID to be transmitted in the SA may change with time. In this case, characteristically, only a Tx UE ID portion is variable since when a target UE ID portion is hopped to and this fact is not known to target UEs, detection cannot be exactly performed. If a hopping pattern of the target UE ID portion is known to a target UE, all ID sequences included in the SA may be hopped according to a predetermined rule. The changeability (hopping) of the ID sequence according to time may be achieved by differently setting a bit field in the D2D grant by an eNB or the ID sequence may change according to a specific rule after the D2D grant is received from the eNB. For example, the ID sequence included in the D2D grant may be used as an initialization parameter of a random sequence and a sequence which changes with time may be generated from a random sequence generated using this parameter.

In mode 2 in which a UE receives a signal regarding a resource pool and resources for D2D communication are selected, an ID may be transmitted via the SA and used to determine an RPT. Here, the ID may be understood as an ID having a short length and derived from an ID (transmission and/or reception (target, group) ID) at an upper layer or as a bit sequence to be used to set either a position to which data is to be transmitted or a scrambling parameter. If a large number of RPT candidates cannot be generated due to the short length of the ID included in the SA, collision between IDs is highly likely to occur. In this case, the same RPT may be used by a large number of Tx UEs. To prevent this problem, bits indicating a specific RPT may be transmitted in some bits of the SA. Otherwise, the specific RPT may be indicated using a combination of bits of an ID bit field and bits of an RPT field in the SA. For example, the ID included in the SA may be used to indicate an RPT set and an RPT indication bit included in the SA may be used to indicate a specific index in the RPT set. As another example, RPT bits included in the SA may be used to indicate a specific RPT set in a resource pool, and the ID included in the SA may be used to indicate the specific RPT in the pool/set indicated by the RPT bits. In this case, bits indicating the RPT set may be semi-statically transmitted rather than being transmitted in each SA. For example, the bits indicating the RPT set may be transmitted in every $n^{th}$ SA, or may be used for a virtual CRC purpose on the assumption that this bit does not change until the SA is transmitted n times even when the bits indicating the RPT set are transmitted in each SA. The RPT bits may be transmitted by borrowing MCS bits or an unused state of another SA bit field rather than being additionally included. Otherwise, both of additionally included bits and an unused state of another bit field may be used to indicate the RPT.

The size of the RPT bits to be used to indicate the SA may vary according to the size of a D2D UE group or the number of Tx UEs belonging to the group. For example, when N policemen belong to a specific police group, the size of bits to be used to indicate the RPT may be set to log 2(N). In this case, the other unused bits may be used for another purpose or may be set to 0 to be used for a virtual CRC purpose.

In modes 1 and 2, an ID of an RPT may be set according to different methods. For example, only a Tx UE ID may be used to indicate an RPT in mode 1, whereas both the Tx UE ID and a target UD ID (group ID) may be used to indicate an RPT in mode 2.

The following information may be further used to set the RPT.

i) Information regarding a transmission opportunity size in view of one UE: This information is information indicating the number of resources to be allocated to the UE from one SA.

ii) Information regarding a number of times of retransmitting each transmission block (TB): This information may be expressed differently as information indicating the number of TBs to be transmitted with respect to one transmission opportunity. In this case, the number of times of retransmitting each TB may be calculated by transmission opportunity size/the number of TBs to be transmitted in one SA. Otherwise, this information may be expressed as information indicating a (maximum) number of times of repeating each TB.

Some of the above information may be preconfigured or may be configured by a network. In the case of a UE out of coverage, the information may be preconfigured or may be signaled with a physical layer signal or an upper layer signal from another UE in the network. Some of the information may be transmitted in an SA. For example, the transmission opportunity size may be preconfigured or may be configured by a network. In this case, the number of times of retransmitting each TB may be transmitted in the SA. On the contrary, the information regarding the transmission opportunity size may be transmitted in the SA, and the number of times of retransmitting each TB may be preconfigured or be a value indicated semi-statically with an upper layer signal by the network.

Specifically, assuming that an 8-bit ID is transmitted in the SA, the number of RPTs that may be identified with IDs is $2^8=256$. Assuming that the number of subframes of a resource pool in mode 2 is 16 and the transmission opportunity size is 8, the number of RPTs that may be generated is $_{10}C_8=12870$. Thus, the RPTs cannot be identified only with ID bits included in the SA and thus additional bits indicating the RPT may be transmitted in the SA according to the above-described method. In the present embodiment, about 6 bits are additionally needed to identify all the RPTs that may be generated. All the RPTs may be indicated using either a combination of unused MCS states and a new bit field or an additional bit field.

Channel Structure for CI

The above-described CI may be transmitted via a PUCCH type channel, a PUCCH piggyback type channel, a channel having a new channel structure (e.g., a D2DSACH), etc. Cases in which the above-described CI is transmitted using these channels will now be described in detail. That is, the structure of a physical D2D Control Channel (PD2DCCH) will be described below. If the PD2DCCH includes resource allocation information, the PD2DCCH may be referred to as a D2DSACH or an SA.

The PD2DCCH may be configured as a PUCCH type. Basically, the PUCCH type is likely to be transmitted in a subframe or slot separately from D2D data. A location to which the D2D CI is to be transmitted may be set as a region to which a D2D control signal is to be transmitted according to the number of RBs configured beforehand as D2D control channel transmission regions at a specific location (e.g., an edge portion) in the frequency domain, similar to a PUCCH region. In this case, when a UE transmitting a D2D signal is a UE permitted to simultaneously transmit a PUSCH/PUCCH, the D2D CI and D2D data may be transmitted together in the same slot or subframe. When a PUCCH type D2D control channel is used, information included in a control channel may be some or all of the D2D CI described above. This structure is transmitted separately from a D2D data channel and thus the RA information indicating resource allocation information of the D2D data channel may be included therein. The MCS, the NDI, etc. may also be included in the structure. Alternatively, only the RA information may be transmitted to a region separately from data and the other CI such as the MCS, the NDI, etc. may be multiplexed into a data region. A format in which the above information is transmitted is likely to be PUCCH format 2 or PUCCH format 3. This is because formats 2 and 3 are designed to transmit more bits than format 1. However, transmission of D2D CI in a format such as PUCCH format 1 is not excluded in the present invention. This is because the size of the D2D CI transmitted separately from D2D data may be small or a large number of resources of the PUCCH format 1 may be occupied by one UE.

One UE may encode the D2D CI (which may include the RA information, the MCS, the NDI, etc.) to be transmitted and then transmit the same in the above format. A PUCCH index to be used in this case may be linked to a CCE index of a control channel indicated by a D2D scheduling node (an eNB or a specific UE) or one of N candidate positions (which are configured, for example, as RRCs) indicated beforehand by the scheduling node may be selected and transmitted. In this case, the selecting of one of the candidate positions indicated beforehand by the scheduling node may be performed by directly receiving an instruction from the scheduling node (for example, one of the candidate positions may be included in DCI or a position of using a PUCCH resource may be indicated by borrowing a TPC field or another field) or by determining a candidate position by selecting one of the candidate positions by a UE. In this case, one UE may use a large number of PUCCH indexes to transmit a D2D control channel unlike the existing PUCCH index. For example, one UE may transmit the D2D control channel by occupying M PUCCH indexes. FIG. 10(a) illustrates a case in which two PUCCH indexes are used to transmit one D2D CI item. In this case, D2D CI of one UE may be mapped to the M PUCCH indexes in a predetermined order. The reason why one UE uses a large number of PUCCH indexes is because the size of the D2D CI may exceed the number of bits that may be included in one PUCCH index.

Multiplexing of a D2D data region and a D2DCCH having a PUCCH format: Resources of a PUCCH and a PUSCH should be consecutively allocated to even a UE, which is not permitted to simultaneously transmit the PUCCH and the PUSCH, so as to transmit a PUCCH type control channel. Thus, a location having the PUCCH format and at which a D2D control channel is to be transmitted may be a predetermined specific PRB pair in a PUSCH region of D2D data. For example, a first (or last) PRB pair of an RB transmitting D2D data may transmit a PUCCH type D2D control channel. Alternatively, for each D2D subframe, the first PRB pair and the last PRB pair may be alternately used as the position of a D2DCCH (so as to obtain an effect of frequency-hopping the D2DCCH).

FIG. 10(b) illustrates a case in which for each D2D sub-channel, a first PRB pair is set as a D2D CI transmission channel. When PUCCH format 3 is used, one PRB pair may transmit coded 48 bits and be multiplexed into D2D data and thus one UE may use the whole OCC. Thus, in this case, D2D CI corresponding to a multiple of the length of the OCC to be used may be transmitted (e.g., 5*48 coded bits may be transmitted when the OCC length=5). In this method, in order to maintain a single carrier property, the D2D CI is transmitted using a PRB pair which has the PUCCH format but is consecutive to a D2D data region. Similarly, information included in the D2D control channel may be some or all of the information listed above.

The PD2DCCH may be configured as a PUSCH piggyback type. When an existing UCI is piggybacked on a PUSCH, the D2DCI may be transmitted by puncturing or rate-matching some REs of a data region. In this case, the REs may be sequentially used for D2D CI mapping in a clockwise direction, starting from a virtual low subcarrier index included in an RB, similar to a manner of transmitting a CQI/PMI during piggybacking of the existing UCI. In this case, in D2D communication, some of symbols at an edge of a subframe are not likely to be used due to Tx/Rx switching as illustrated in FIG. 11(a). Thus, when the D2D CI is piggybacked on a D2D subframe and is 'time-first' mapped starting from a low subcarrier frame similar to a CQI/PMI, the following operation is suggested.

A first symbol and/or a last symbol may be excluded in D2D CI mapping. This is because the first symbol and/or the last symbol are likely to be used as a guard period due to Tx/Rx switching. For AGC training, some samples consecutive to the guard period are not likely to be used to receive data. Thus, in this case, the D2D CI may not be mapped to a symbol including the guard period. In some cases, one or more symbols are likely to be used for the guard period and AGC training and thus a symbol to which the D2D CI is mapped may be configured beforehand according to the guard period and an AGC training period. For example, a symbol to which the D2D CI may be mapped may be included in a D2D synchronization channel, configured as an RRC, or determined beforehand. As described above, the D2D CI is mapped to a symbol that may be fully used but D2D data may be mapped to a symbol which is partially punctured. Otherwise, the D2D data may be mapped only to an SC-FDM (or OFDM) symbol that may be fully used, similar to the D2D CI, and only a reference signal may be mapped to a symbol which is partially punctured due to Tx/Rx switching. It may be prescribed that the reference signal be mapped to the first symbol and/or the last symbol only when the D2D CI is piggybacked on a D2D data region, so that when the D2D CI is transmitted together with the D2D data, the precision of channel estimation may be increased to improve a capability of decoding data and control information.

Alternatively, the D2D CI may be mapped only to an even-numbered (or odd numbered) subcarrier of the first symbol and/or the last symbol. Due to this structure, a first symbol and/or a last symbol of a D2D subframe may be mapped through 30 kHz subcarrier spacing, similar to an SRS. Thus, even if some symbols cannot be used for Tx/Rx switching or AGC due to repeated transmission of the same symbol in the time domain, the symbols may be restored. FIG. 11(b) illustrates that D2D CI or D2D data is not mapped to odd-numbered REs of first and last symbols.

In an existing UCI piggybacking scheme, an A/N or an RI is mapped to a symbol near a DMRS. According to this method, information having high importance among D2D CI information is arranged near the DMRS to achieve high channel estimation performance. In this case, when a guard period is used in a first or last symbol of a D2D subframe, a location on a symbol to which D2D CI is to be mapped should be adjusted. In particular, in the case of an extended CP, since an RI may be mapped to a first symbol, the D2D CI may be punctured and thus a serious loss may occur in receiving data when the D2D CI is mapped.

First, in the existing UCI piggybacking scheme, a column set used for an RI and a HARQ-ACK is as shown in Tables 2 or 3 below.

TABLE 2

| CP configuration | Column set |
| --- | --- |
| Normal | {1, 4, 7, 10} |
| Extended | {0, 3, 5, 8} |

TABLE 3

| CP configuration | Column set |
| --- | --- |
| Normal | {2, 3, 8, 9} |
| Extended | {1, 2, 6, 7} |

Piggybacking of a HARQ-ACK and an RI on a normal CP is illustrated in FIG. 12(a). An extended CP is illustrated in FIG. 12(b). In this case, when a first symbol or a last symbol is used as a guard period, the RI cannot be mapped. Typically, this situation occurs in some D2D subframes and thus a solution therefor is needed.

If D2D CI is mapped to the vicinity of a DMRS, first, some CI having high importance among the D2D CI may be mapped to the vicinity of the DMRS. In this case, as in the existing PUSCH piggybacking scheme, the D2D CI is sequentially filled with specific information through frequency-first mapping in a predetermined symbol order, starting from the vicinity of the DMRS (mapping may be performed starting from a high virtual carrier index in this case but may be performed starting from a low virtual carrier index), rather than mapping the specific information to another symbol according to importance. For example, the D2D CI, such as an MCS, an ID (which is shortened through hashing), etc., is sequentially filled in the vicinity of the DMRS and is then sequentially filled in symbols in a predetermined order after one symbol.

Alternatively, after the number of required symbols is determined according to the whole bit size of the D2D CI mapped to the vicinity of the DMRS, REs of a corresponding symbol may be 'frequency-first' punctured (puncturing may be performed starting from an RE having a high virtual subcarrier index or an RE having a low virtual subcarrier index in this case) (otherwise, data is rate-matched in consideration of REs to be used for CI) and then coded bits of the D2D CI are 'time-first' mapped to a corresponding region.

Alternatively, the D2D CI mapped to the vicinity of the DMRS is 'time-first' punctured according to an SC-FDM symbol determined beforehand according to the whole bit size, and coded bits of the D2D CI are 'time-first' mapped to a corresponding region.

Specifically, in the case of a normal CP, an order of symbols to be filled with the D2D CI may be 3→8→2→9→4→6→1→10. In the case of an extended CP, an order of symbols to be filled with the D2D CI may be 2→6→1→7→3→5→8.

In both the normal CP and the extended CP, a first symbol and/or a last symbol is not used for D2D CI mapping. When a guard period is used for only the first symbol or the last symbol, the D2D CI is not mapped to a symbol including the guard period.

The D2D CI is sequentially filled, starting from the vicinity of the DMRS. The D2D CI may be filled in a symbol between two DMRSs in the vicinity of the DMRS earlier than external symbols. This is because higher channel estimation performance may be achieved through channel interpolation between the DMRSs.

Next, as in the existing PUSCH piggybacking scheme, symbols to which the D2D CI is mapped is determined beforehand according to the importance thereof, but symbols which are likely to include a guard period or which include the guard period are excluded in D2D CI mapping. In this case, among the D2D CI, information having high importance will be referred to as 'D2D CI class A' and information having relatively low importance will be referred to as 'D2D CI class B'. These terms are merely used to represent the importance of the information and thus the present invention should not be limited by these terms. For example, the D2D CI class A may include a UE ID, an MCS, etc., and the D2D CI class B may include information regarding the number of APs, a MIMO technique, etc. The above classes according to the D2D CI may be determined beforehand.

Examples of the above suggestion are shown in Tables 4 and 5 below.

TABLE 4

| CP configuration | Column set |
| --- | --- |
| Normal | {2, 3, 8, 9} |
| Extended | {1, 2, 6, 7} |

TABLE 5

| CP configuration | Column set |
| --- | --- |
| Normal | {1, 4, 7, 10} |
| Extended | {3, 5, 8, 9} or {3, 4, 5, 8} |

In a D2D subframe, the D2D CI is not mapped to a symbol which is used as the guard period or which is likely to be used as the guard period.

The D2D CI may be mapped to a predetermined symbol position according to the importance thereof (see Tables 4 and 5). Furthermore, additional channel coding may be used according to the importance of the D2D CI. For example, information having high importance may be first mapped to a symbol in the vicinity of a DMRS through RM coding or low-rate coding. A symbol having low importance may be mapped to a symbol at a position relatively distant (from the DMRS) simply through repetitive coding or simplex coding. Alternatively, the contents of the D2D CI may be encoded through one channel coding technique (e.g., convolutional code) regardless of the importance thereof, and mapped to a control channel separately from an RE or data according to one of the above methods.

Device Configuration According to Embodiment of the Present Invention

Figure 13:
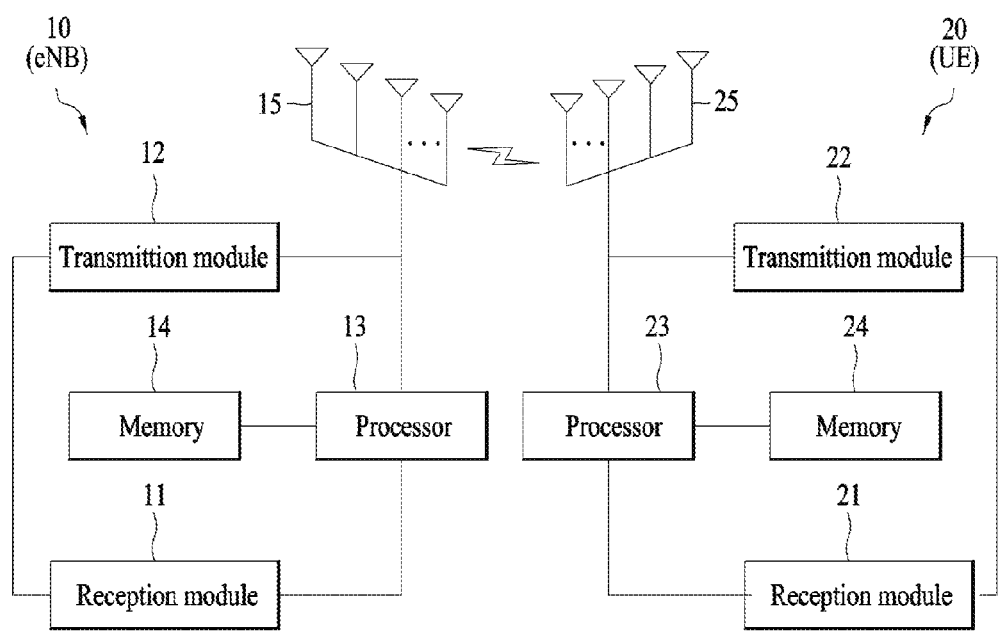
FIG. 13 is a block diagram of a transmitting/receiving apparatus.

FIG. 13 is a diagram for configuration of a transmit point apparatus and a user equipment according to embodiment of the present invention.

Referring to FIG. 13, a transmit point apparatus 10 may include a receive module 11, a transmit module 12, a processor 13, a memory 14, and a plurality of antennas 15.

The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 13, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 13 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

The invention claimed is:

1. A method of transmitting and receiving a device-to-device (D2D) signal by a user equipment (UE) in a wireless communication system, the method comprising:
receiving, from a D2D signal transmitting UE, information including a first resource pattern for transmission (RPT) corresponding to a first bitmap via a channel for a scheduling assignment; and
receiving, from the D2D signal transmitting UE, a D2D signal in one or more subframes indicated by the first RPT,
wherein:
each of bits of the first RPT indicates whether the D2D signal is transmitted in at least one of subframes included in a period for the channel for the scheduling assignment;
the one or more subframes indicated by the first RPT are selected by the D2D signal transmitting UE from among subframes which are indicated by a second RPT, corresponding to a second bitmap, signaled from an eNB such that the one or more subframes meet both of requirements from the first bitmap and the second bitmap; and
when a number of subframes included in the period for the channel for the scheduling assignment is greater in number than a number of the bits of the first RPT, at least one of the bits of the first RPT indicates whether the D2D signal is permitted to be transmitted in two or more of the subframes.

2. The method according to claim 1, wherein, when the subframes included in the period for the channel for the scheduling assignment is greater in number than the number of the bits of the first RPT, the UE repeatedly uses the first RPT.

3. The method according to claim 1, wherein, when the number of the subframes included in the period for the channel for the scheduling assignment is n times the number of the bits of the first RPT, the UE repeatedly uses the first RPT in the period for the channel for the scheduling assignment.

4. The method according to claim 1, wherein the first RPT is repeatedly used in the period for the channel for the scheduling assignment.

5. The method according to claim 4, wherein, when the number of the subframes included in the period for the channel for the scheduling assignment is not a multiple of the number of the bits of the first RPT, only a portion of the first RPT is used when the first RPT is lastly repeatedly used.

6. The method according to claim 5, wherein only the portion of the first RPT is used by sequentially using the bits of the first RPT.

7. The method according to claim 5, wherein the bits of the portion of the first RPT is the same in number as a remainder obtained by dividing the number of the subframes included in the period for the channel for the scheduling assignment by the number of the bits of the first RPT.

8. The method according to claim 1, wherein the UE receives, from a base station, an instruction regarding a resource region for transmission of the D2D signal.

9. The method according to claim 1, wherein the UE receives a resource pool for transmission of the D2D signal from a base station.

10. The method according to claim 9, wherein the bits of the first RTP indicate only subframes included in the resource pool.

11. The method according to claim 1, wherein the scheduling assignment comprises one or more of the first RPT.

12. The method according to claim 1, wherein the scheduling assignment is transmitted from a base station or a relay.

13. A device-to-device (D2D) user equipment for transmitting and receiving a D2D signal in a wireless communication system, the D2D user equipment comprising:
a transmission module; and
a processor,
wherein:
the processor receives information including a first resource pattern for transmission (RPT) corresponding to a first bitmap via a channel for a scheduling assignment from a D2D signal transmitting UE, and receives a D2D signal in one or more subframes indicated by the first RPT from the D2D signal transmitting UE;
each of bits of the first RPT indicates whether the D2D signal is transmitted in one of subframes included in a period for the channel for the scheduling assignment;
the one or more subframes indicated by the first RPT are selected by the D2D signal transmitting UE from among subframes which are indicated by a second RPT, corresponding to a second bitmap, signaled from an eNB such that the one or more subframes meet both of requirements from the first bitmap and the second bitmap; and
when the subframes included in the period for the channel for the scheduling assignment is greater in number than the bits of the first RPT, at least one of the bits of the first RPT indicates whether the D2D signal is permitted to be transmitted in two or more of the subframes.

* * * * *